United States Patent
Yamada et al.

(10) Patent No.: US 7,185,621 B2
(45) Date of Patent: Mar. 6, 2007

(54) GLOW PLUG WITH COMBUSTION PRESSURE DETECTING FUNCTION

(75) Inventors: Tatsunori Yamada, Seto (JP); Yuichi Yamada, Kagamihara (JP); Koji Okazaki, Ichinomiya (JP); Masayoshi Matsui, Ichinomiya (JP); Keiji Ozeki, Nagoya (JP); Takahiro Suzuki, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 11/196,448

(22) Filed: Aug. 4, 2005

(65) Prior Publication Data

US 2006/0032472 A1 Feb. 16, 2006

(30) Foreign Application Priority Data

| | | |
|---|---|---|
| Aug. 5, 2004 | (JP) | 2004-229525 |
| Mar. 25, 2005 | (JP) | 2005-089525 |
| Jun. 27, 2005 | (JP) | 2005-187099 |

(51) Int. Cl.
*G01M 15/08* (2006.01)
*F02P 19/02* (2006.01)
(52) U.S. Cl. ................... 123/145 A; 73/35.13
(58) Field of Classification Search ............ 123/145 A, 123/145 R, 143 C, 169 R; 219/270, 267, 219/553, 544, 210; 361/264, 265, 266; 73/35.11, 73/35.13
See application file for complete search history.

(56) References Cited

U.S. PATENT DOCUMENTS

| | | | | |
|---|---|---|---|---|
| 4,545,339 A | * | 10/1985 | Brooks et al. | 123/145 A |
| 4,620,512 A | * | 11/1986 | Brooks et al. | 123/145 A |
| 5,084,607 A | * | 1/1992 | Shafer et al. | 219/270 |
| 5,319,180 A | * | 6/1994 | Locher et al. | 219/270 |
| 5,676,100 A | * | 10/1997 | Dam et al. | 123/145 A |
| 5,922,229 A | * | 7/1999 | Kurano | 219/270 |
| 2004/0182145 A1 | | 9/2004 | Okazaki et al. | |
| 2005/0229685 A1 | | 10/2005 | Sakamoto et al. | |

FOREIGN PATENT DOCUMENTS

| | | |
|---|---|---|
| JP | 7-55833 | 3/1995 |
| JP | 2002-81333 | 3/2002 |
| JP | 2002-327919 | 11/2002 |
| JP | 2004-278932 | 10/2004 |

* cited by examiner

*Primary Examiner*—Andrew M. Dolinar
*Assistant Examiner*—Johnny H. Hoang
(74) *Attorney, Agent, or Firm*—Sughrue Mion, PLLC

(57) ABSTRACT

A glow plug comprising: a cylindrical housing; a heater member as defined herein; a conductive center pole as defined herein; a first piezoelectric element as defined herein; and a second piezoelectric element as defined herein, wherein each of said first piezoelectric element and said second piezoelectric element is subjected to a preload for compressing it in said axial direction and is arranged such that, when said center pole is displaced to a root-end side, a load to be applied to one of said first piezoelectric element and said second piezoelectric element for compressing the same in said axial direction increases whereas a load to be applied to the other for compressing the same in said axial direction decreases.

13 Claims, 19 Drawing Sheets

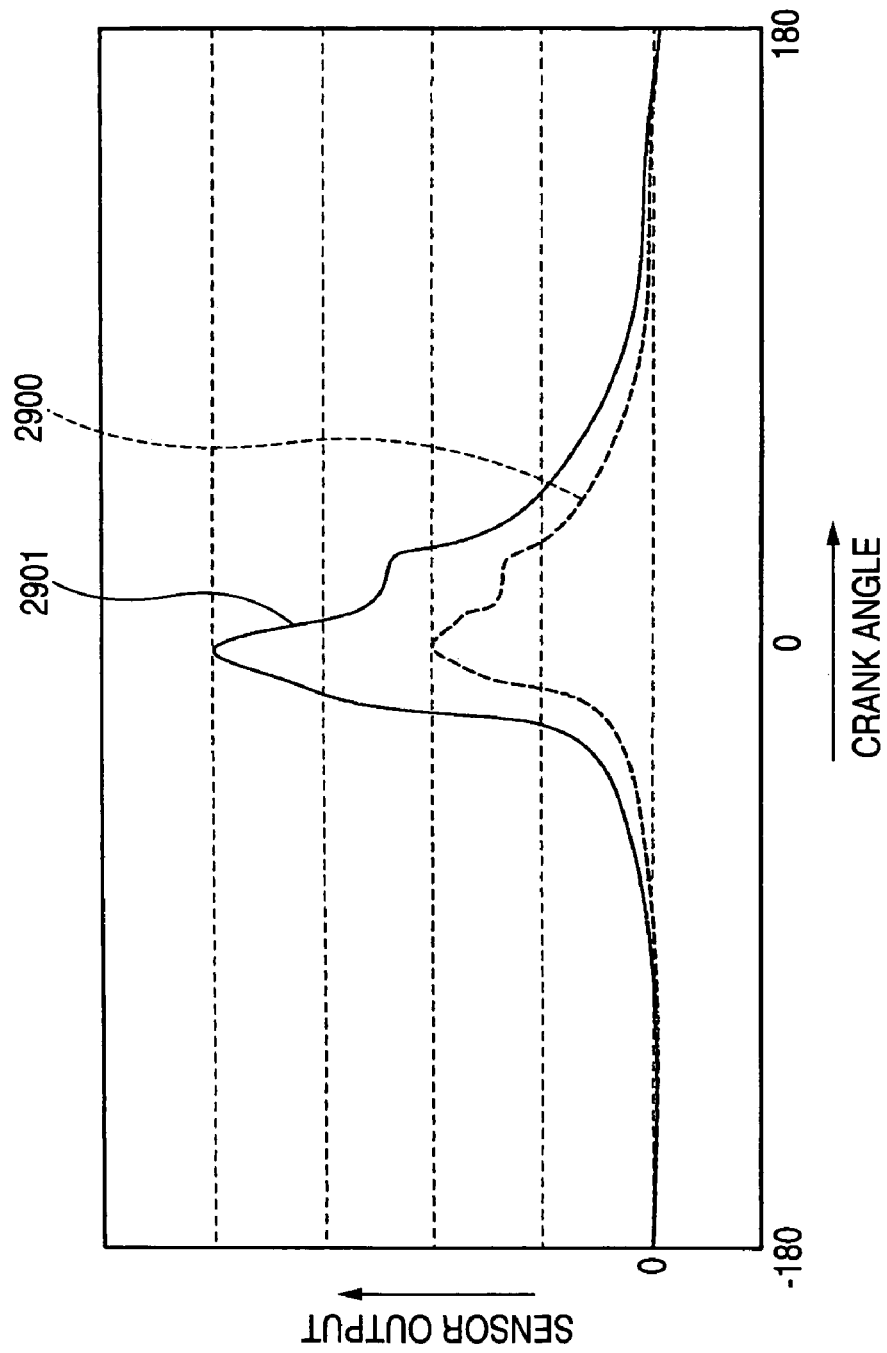

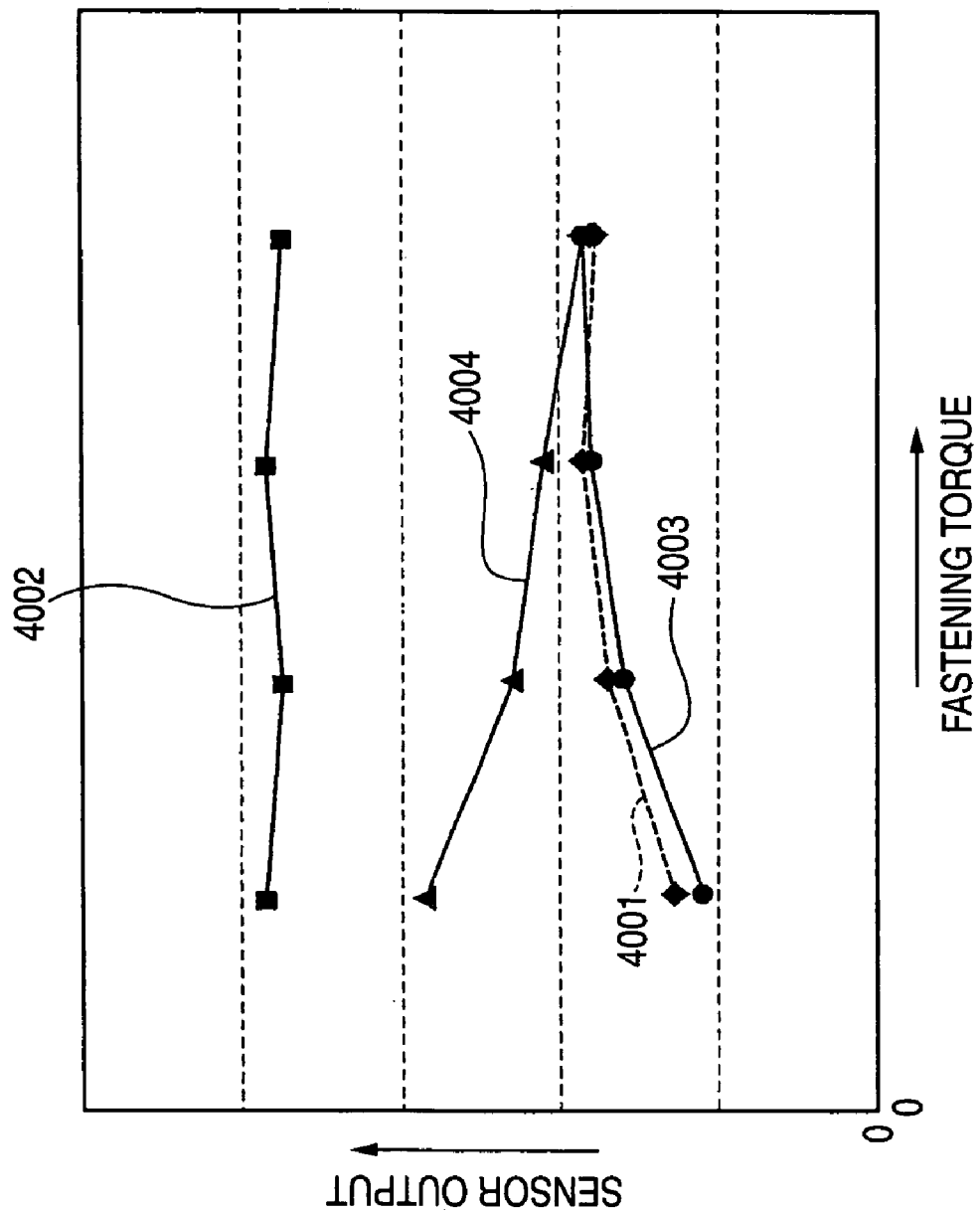

GLOW PLUG WITH COMBUSTION PRESSURE DETECTING FUNCTION

FIELD OF THE INVENTION

The present invention relates to a glow plug with a combustion pressure detecting function, which is used as a start aiding device for an internal combustion engine such as a Diesel engine and which can detect a change in the combustion pressure of the internal combustion engine.

BACKGROUND THE INVENTION

As a glow plug having the combustion pressure detecting function added to the glow plug for aiding the start of an internal combustion engine, there has been provided a plug having a combustion pressure sensor packaged therein, as disclosed in JP-A-2002-327919 (page 2, FIG. 1).

This glow plug with the combustion pressure detecting function is equipped with: a cylindrical housing; a metallic center pole having held in the housing with one end side being exposed from the housing, and electrically conducted to a heating member; and a combustion pressure sensor for detecting the combustion pressure in terms of the force which is caused to act on a pipe member by the combustion pressure and transmitted through the center pole. Moreover, a housing portion is formed between the inner circumference on the other end side of the housing and the outer circumference of the center pole. In this housing portion, there is so arranged a combustion pressure sensor composed of a piezoelectric element that it is subjected to a compressive stress (or a preload) in the axial direction.

SUMMARY OF THE INVENTION

In the combustion pressure sensor of the type thus using the piezoelectric element under a preload in a compressing direction, however, the sensitivity (i.e., the ratio of the quantity of produced electric charge to the pressure) may become different according to the magnitude of the preload. Specifically, the sensitivity becomes lower for a lower preload on the combustion pressure sensor but higher for a higher preload.

In case the glow plug having the combustion pressure detecting function described in JP-A-2002-327919 is mounted in the internal combustion engine, for example, the preload applied through the center pole to the combustion pressure sensor is decreased, when fastened with a screw, by the axial shrinkage of the leading-end portion of the housing closer to the fastened portion thereby to degrade the sensitivity of the combustion pressure sensor.

In addition, the glow plug having the combustion pressure detecting function may be configured such that the piezoelectric element is arranged between that face of the root-end portion of the housing, which confronts the leading-end side, and that face on the center pole on the leading-end side, which confronts the root-end side. On the contrary to the glow plug having the combustion pressure detecting function of JP-A-2002-327919, the glow plug having the combustion pressure detecting function of that type increases the preload to be applied to the piezoelectric element, in case it is mounted in the internal combustion engine, so that the sensitivity of the combustion pressure sensor rises.

Thus in either of the aforementioned cases, the preload to be applied to the piezoelectric element increases or decreases due to the different in the fastening force (or the fastening torque) of the externally threaded portion when the glow plug having the combustion pressure detecting function is to be mounted in the internal combustion engine. As a result, the sensitivity of the combustion pressure sensor may disperse to fail to achieve the proper detecting output.

If the temperature of the piezoelectric element changes with the use of the glow plug, moreover, a charge may be produced in the piezoelectric element by an electrically focusing effect independently of the variation in the combustion pressure thereby to adversely affect the detection output seriously.

The present invention has been conceived in view of those problems and has an object to provide a glow plug having a combustion pressure detecting function, which can detect a variation in the combustion pressure.

According to an aspect of the invention, there is provided a glow plug with a combustion pressure detecting function, comprising: a cylindrical housing; a heater member held in the housing for generating heat upon energization; a conductive center pole inserted into the housing and conducted to the heater member for being displaced relative to the housing in the axial direction along the axis of the housing in accordance with a change in the combustion pressure of an internal combustion engine in use; a first piezoelectric element for producing a charge in response to a change in a stress applied to itself, the first piezoelectric element having a first plus face for producing a plus charge and a first minus face for producing a minus charge when the first, piezoelectric element is compressed in the axial-direction; and a second piezoelectric element for producing a charge in response to a change in a stress applied to itself, the second piezoelectric element having a second plus face for producing a plus charge and a second minus face for producing a minus charge when the second piezoelectric element is compressed in the axial direction; wherein each of the first piezoelectric element and the second piezoelectric element is subjected to a preload for compressing itself in the axial direction and is arranged such that, when the center pole is displaced to a root-end side, a load to be applied to one of the first piezoelectric element and the second piezoelectric element for compressing the same in the axial direction increases whereas a load to be applied to the other for compressing the same in the axial direction decreases.

The glow plug having the combustion pressure detecting function of the invention is equipped with the first piezoelectric element and the second piezoelectric element. Moreover, one of the piezoelectric elements is arranged to have a compressive load increased in the axial direction, but the other is arranged to have the load decreased when the center pole is disposed to the root-end side. When the center pole is displaced, a higher output (e.g., a twice output) of those of the two piezoelectric elements can be obtained if the charges of the common polarity produced from the individual piezoelectric elements are summed up.

Let the case be considered, in which the first and second piezoelectric elements are arranged such that the first piezoelectric element has an axially compressing load increased whereas the second piezoelectric element has an axially compressing load decreased when the center pole is displaced to the root-end side. In this case, a first output is obtained by connecting the first plus face of the first piezoelectric element and the second minus face of the second piezoelectric element, and a second output is obtained by connecting the first minus face of the first piezoelectric element and the second plus face of the second piezoelectric element. When the center pole is displaced to the root-end side, the axially compressing load increases in the first piezoelectric element so that the plus charge is produced on the first plus face whereas the minus charge is produced on the first minus face. In the second piezoelectric element, on the other hand, the axially compressing load decreases so that the minus charge and the plus charge are produced on the second plus face and on the second minus face, respectively. Therefore, the plus charges produced on the first plus face and on the second minus face can be acquired from the first output, and the minus charges produced on the first minus face and on the second plus face can be acquired from the second output. Thus, it is possible to acquire a higher output, e.g., a double output than that acquired with the one piezoelectric element.

Generally, the piezoelectric element has an electrically focusing effect to produce charges by its own temperature change even if the stress applied to itself has no change. When the temperature of the piezoelectric element itself changes with the energization of the glow plug or the engine start, the output may be drifted by the charges produced by the electrically focusing effect thereby to cause an erroneous detection or to make the proper measurement of the combustion pressure difficult.

In the glow plug having the combustion pressure detecting function of the invention, however, the first plus face and the second minus face of the two piezoelectric elements are connected, and the first minus face and the second plus face are connected, as has been described hereinbefore. Then, the charge, which is produced on the first plus face of the first piezoelectric element by the electrically focusing effect accompanying the temperature change (e.g., the rises of the temperatures of the two piezoelectric elements), can be canceled with the charge of the opposite polarity, which is produced on the second minus face of the second piezoelectric element. Likewise, the charge produced on the first minus face of the first piezoelectric element can be canceled with the charge of the opposite polarity produced on the second plus face of the second piezoelectric element. Thus, it is possible to reduce the fluctuation of the detected output resulting from the electrically focusing effect.

Here, the piezoelectric element may be made of a material having a piezoelectric effect or a reverse piezoelectric effect and can be specifically exemplified by a well-known piezoelectric component such as quartz, lead titanate, lead titanate-zirconate or barium titanate.

Moreover, the first piezoelectric element may be so polarized in a predetermined direction that it may produce, when compressed in the axial direction, the plus charge on the first plus face and the minus charge on the first minus face. Therefore, the first piezoelectric element can be exemplified by a mode, in which it is polarized in the axial direction and in which the first plus face and the first minus face are normal to the axis (or in the polarizing direction), and can be specified such that the ring-shaped piezoelectric element is polarized in the axial direction so that the upper face and the bottom face normal to the axis (i.e., the polarizing direction) may be the first plus face and the first minus face. In another mode, the first piezoelectric element may be polarized in the direction perpendicular to the axis to arrange the first plus face and the first minus face in parallel with the axis and normal to the polarizing direction. Specifically, the first piezoelectric element may also be exemplified such that the ring-shaped piezoelectric element is polarized in its axial direction, and such that the inner circumference and the outer circumference parallel to the axis and normal to the polarizing direction (i.e., the radial direction) are the first plus face and the first minus face. These modifications apply to the second piezoelectric element.

Moreover, the charges, which are produced on the first plus face and the first minus face of the first piezoelectric element and on the second plus face and the second minus face of the second piezoelectric element may be individually derived to the outside through four lead wires and may be suitably summed up. Alternatively, in the glow plug, the first plus face and the second minus face, or the first minus face and the second plus face can be made conductive, and the charges of the two faces can be individually derived to the outside through two lead wires. In the glow plug, alternatively, the first plus face and the second minus face may be rendered conductive so that the charges of the two faces may be derived to the outside through lead wires, but the first minus face and the second plus face may be individually conducted to the housing so that they may take the earth level. In the glow plug, on the contrary, the first minus face and the second plus face may be made conductive so that the charges of the two faces may be derived to the outside by using the lead wires, but the first plus face and the second minus face may be individually conducted to the housing to take the earth level.

In the aforementioned glow plug with the combustion pressure detecting function, the first piezoelectric element is polarized in the axial direction, the first plus face and the first minus face are a 1-1 face and a 1-2 face normal to the axis, respectively, the second piezoelectric element is polarized in the axial direction, and the second plus face and the second minus face are a 2-1 face and a 2-2 face normal to the axis, respectively.

The first piezoelectric element of the glow plug having the combustion pressure detecting function of the invention is so polarized in the axial direction that the 1-1 face and the 1-2 face normal to the axis are the first plus face and the first minus face, respectively. Moreover, the second piezoelectric element is also so polarized in the axial direction that the 2-1 face and the 2-2 face normal to the axis are the second plus face and the second minus face, respectively.

Thus, in the first and second piezoelectric elements of the invention, the faces for producing the charges are normal to the polarizing direction and are subjected to the load in the polarizing direction. Therefore, the quantity of charge to be produced on the 1-1 face and so on is higher than that of the case, in which the load is applied in the direction perpendicular to the polarizing direction. Therefore, it is possible to measure the combustion pressure more properly.

If, moreover, the charges of the common polarity to be produced from the individual piezoelectric elements are summed up when the center pole is displaced, it is possible like before to acquire a higher (or double) output of those of the two piezoelectric elements.

In the glow plug having the combustion pressure detecting function of the invention, moreover, the first piezoelectric element and the second piezoelectric element are reversed in their polarizing directions, as has been described hereinbefore, if the 1-1 face and the 2-2 face are connected and if the 1-2 face and the 2-1 face are connected. Then, the charge produced on the 1-1 face of the first piezoelectric element by the temperature change can be canceled by the charge of the opposite polarity produced on the 2-2 face of the second piezoelectric element, and the charge produced on the 1-2 face of the first piezoelectric element can also be canceled by the charge of the opposite polarity produced on the 2-2 face of the second piezoelectric element. Thus, it is possible to reduce the fluctuation of the detected output by the electrically focusing effect.

According to another aspect of the invention, there is provided a glow plug with a combustion pressure detecting function, comprising: a heater member for generating heat when energized; a cylindrical housing including: a housing leading-end portion positioned on the most leading-end side of an axial direction; a housing root-end portion positioned on the most root-end side of the axial direction; an externally threaded portion positioned between the housing leading-end portion and the housing root-end portion for screwing the housing into a mounting hole of an internal combustion engine; a sealing portion positioned between the housing leading-end portion and the externally threaded portion and pressed into direct or indirect contact with a predetermined portion in the mounting hole for holding the gas-tightness between the housing and the mounting hole; and a heater holding portion positioned on the leading-end side of the externally threaded portion in the axial direction, the housing being mounted in the internal combustion engine by the screwing such that the housing leading-end portion is positioned on the combustion chamber side of the internal combustion engine; a conductive center pole including: a center pole root-end portion positioned on the axial root-end side, and a center pole leading-end portion positioned on the axial leading-end side, the center pole being housed in the housing, being arranged such that the center pole root-end portion protrudes from the housing root-end portion, being electrically conducted at the center pole leading-end portion with the heater member, and being jointed directly or indirectly and mechanically rigidly to the heater member; a first piezoelectric element polarized in the axial direction for producing charges in response to a change in the stress to be applied to itself and including; a 1-1 face and a 1-2 face normal to the axis for producing a plus charge on the 1-1 face and a minus charge on the 1-2 face when the first piezoelectric element is compressed in the axial direction; and a second piezoelectric element polarized in the axial direction for producing charges in response to a change in the stress to be applied to itself and including: a 2-1 face and a 2-2 face normal to the axis for producing a plus charge on the 2-1 face and a minus charge on the 2-2 face when the second piezoelectric element is compressed in the axial direction, wherein the first piezoelectric element and the second piezoelectric element are clamped in the axial direction while engaging directly or indirectly with the housing root-end portion of the housing and the center pole, and wherein each of the first piezoelectric element and the second piezoelectric element is subjected to a preload for compressing itself in the axial direction and is arranged such that, when the center pole is displaced to a root-end side, a load to be applied to one of the first piezoelectric element and the second piezoelectric element for compressing the same in the axial direction increases whereas a load to be applied to the other for compressing the same in the axial direction decreases.

The glow plug having the combustion pressure detecting function of the invention is also equipped with the first piezoelectric element and the second piezoelectric element. Moreover, one of the piezoelectric elements is arranged to have a compressive load increased in the axial direction, but the other is arranged to have the load decreased when the center pole is disposed to the root-end side. When the center pole is displaced, a higher output (e.g., a twice output) of those of the two piezoelectric elements can be obtained if the charges of the common polarity produced from the individual piezoelectric elements are summed up.

Let the case be considered, in which the first and second piezoelectric elements are arranged such that the first piezoelectric element has an axially compressing load increased whereas the second piezoelectric element has an axially compressing load decreased when the center pole is displaced to the root-end side. In this case, a first output is obtained by connecting the 1-1 face of the first piezoelectric element and the 2-2 face of the second piezoelectric element, and a second output is obtained by connecting the 1-2 face of the first piezoelectric element and the 2-1 face of the second piezoelectric element. When the center pole is displaced to the root-end side, the axially compressing load increases in the first piezoelectric element so that the plus charge is produced on the 1-1 face whereas the minus charge is produced on the 1-2 face. In the second piezoelectric element, on the other hand, the axially compressing load decreases so that the minus charge and the plus charge are produced on the 2-1 face and on the 2-2 face, respectively. Therefore, the plus charges produced on the 1-1 face and on the 2-2 face can be acquired from the first output, and the minus charges produced on the 1-2 face and on the 2-1 face can be acquired from the second output. Thus, it is possible to acquire an output of two times as high as that acquired with the one piezoelectric element.

When the housing of the glow plug of the invention is mounted in the mounting hole of the internal combustion engine, the portion of the housing between the externally threaded portion and the sealing portion is axially compressed as the fastening operation proceeds, so that its size is slightly shrunken by the elasticity. On the other hand, the center pole is jointed directly or indirectly and mechanically rigidly to the heater member. Specifically, when the heater member is displaced in the axial direction, the center pole is also displaced in the axial direction. The heater member is held in that state in the housing so that the center pole is displaced, as the housing is shrunken, relatively to the root-end side with respect to the housing, i.e., the externally threaded portion of the housing.

Here in the glow plug having the combustion pressure detecting function of the invention, in case the center pole is displaced to the root-end side of the housing, the compressive preload to be applied to one of the two piezoelectric elements increases, but the compressive preload to the other decreases. In the case of the aforementioned arrangement, more specifically, the compressive preload to be applied to the first piezoelectric element increases, but the compressive preload to the second piezoelectric element decreases. In case the preload to be applied to the piezoelectric element increases, as described above, the sensitivity of the pressure change has a tendency to rise. In case the preload decreases, the sensitivity of the pressure change has a tendency to drop. In the aforementioned case, therefore, the sensitivity of the first piezoelectric element rises, but the sensitivity of the second piezoelectric element drops.

In the glow plug having the combustion pressure detecting function of the invention, therefore, the 1-1 face and the 2-2 face of the two piezoelectric elements are connected to each other, and the 1-2 face and the 2-1 face are connected, so that the charges individually produced from the first piezoelectric element and the second piezoelectric element are summed up. Then, the charges are outputted while canceling the changes in the sensitivities of the individual piezoelectric elements. This reduces the influences on the sensitivities of the piezoelectric elements due to the difference in magnitude between the displacements of the center pole, which are caused when the glow plug is fastened, that is, the difference in magnitude between the fastening torques at the screwing time. Even if the fastening operation is done with the different fastening torques, the two piezoelectric elements can suppress their sensitivity fluctuations. It is, therefore, possible to provide the glow plug having the combustion pressure detecting function, which can manage the fastening torque easily and which can detect the variation in the combustion pressure properly.

Moreover, the piezoelectric element has an electrically focusing effect to produce charges by its own temperature change even if the stress applied to itself has no change. When the temperature of the piezoelectric element itself changes with the energization of the glow plug or the engine start, the output may be drifted by the charges produced by the electrically focusing effect thereby to cause an erroneous detection or to make the proper measurement of the combustion pressure difficult.

In the glow plug having the combustion pressure detecting function of the invention, however, the 1-1 face and the 2-2 face of the two piezoelectric elements are connected, and the 1-2 face and the 2-1 face are connected, as has been described hereinbefore. Then, the first piezoelectric element and the second piezoelectric element are connected to have their polarizing directions reversed from each other. Then, the charge, which is produced on the 1-1 face of the first piezoelectric element by the temperature change, can be canceled with the charge of the opposite polarity, which is produced on the 2-2 face of the second piezoelectric element. Likewise, the charge produced on the 1-2 face of the first piezoelectric element can be canceled with the charge of the opposite polarity produced on the 2-1 face of the second piezoelectric element. Thus, it is possible to reduce the fluctuation of the detected output resulting from the electrically focusing effect.

On the other hand, the two piezoelectric elements are arranged to engage with the housing root-end portion and the root-end side of the center pole, that is, at the positions remotest from the internal combustion engine, in which the heater member and the glow plug are mounted. Therefore, the piezoelectric elements are hardly influenced by the temperature rises of the heater member and the internal combustion engine.

According to still another aspect of the invention, there is provided a glow plug with a combustion pressure detecting function, comprising: a heater member for generating heat when energized; a cylindrical housing including: a housing leading-end portion positioned on the most leading-end side of an axial direction; a housing root-end portion positioned on the most root-end side of the axial direction and including an inward protrusion protruding radially inward and having a leading-end inward protruding face directed to the axial leading-end side, and a confronting portion positioned on the axial leading-end side of the inward protrusion and having a root-end confronting face confronting the leading-end inward protruding face; an externally threaded portion positioned between the housing leading-end portion and the housing root-end portion for screwing the housing into a mounting hole of an internal combustion engine; a sealing portion positioned between the housing leading-end portion and the externally threaded portion and pressed into direct or indirect contact with a predetermined portion in the mounting hole for holding the gas-tightness between the housing and the mounting hole; and a heater holding portion positioned on the leading-end side of the externally threaded portion in the axial direction, the housing being mounted in the internal combustion engine by the screwing such that the housing leading-end portion is positioned on the combustion chamber side of the internal combustion engine; a conductive center pole including: a center pole root-end portion positioned on the axial root-end side; a center pole leading-end portion positioned on the axial leading-end side; and an outward protrusion positioned between the center pole root-end portion and the center pole leading-end portion and protruding radially outward, the outward protrusion having a root-end outward protruding face directed to the axial root-end side and a leading-end outward protruding face directed to the axial leading-end side, the center pole being housed in the housing, being arranged such that the center pole root-end portion protrudes from the housing root-end portion, being electrically conducted at the center pole leading-end portion with the heater member, and being jointed directly or indirectly and mechanically rigidly to the heater member; a first piezoelectric element clamped between the leading-end inward protruding face of the inward protrusion of the housing and the root-end outward protruding face of the outward protrusion and polarized in the axial direction for producing charges in response to a change in the stress to be applied to itself and including: a 1-1 face and a 1-2 face normal to the axis for producing a plus charge on the 1-1 face and a minus charge on the 1-2 face when the first piezoelectric element is compressed in the axial direction; and a second piezoelectric element clamped between the root-end confronting face of the confronting portion of the housing and the leading-end outward protruding face of the outward protrusion and polarized in the axial direction for producing charges in response to a change in the stress to be applied to itself and including: a 2-1 face and a 2-2 face normal to the axis for producing a plus charge on the 2-1 face and a minus charge on the 2-2 face when the second piezoelectric element is compressed in the axial direction, wherein each of the first piezoelectric element and the second piezoelectric element is subjected to a preload for compressing itself in the axial direction.

When the center pole of the glow plug having the combustion pressure detecting function having the first piezoelectric element and the second piezoelectric element is displaced to the root-end side, one of the piezoelectric elements may be arranged to have a compressive load increased in the axial direction, but the other may be arranged to have the load decreased, as has been described hereinbefore. However, the glow plug is liable to have a complicated configuration, if it is so configured as to arrange the first piezoelectric element and the second piezoelectric element.

In the glow plug having the combustion pressure detecting function of the invention, on the contrary, the first piezoelectric element clamped between the inward protrusion of the housing and the outward protrusion of the center pole, and the second piezoelectric element clamped between the confronting portion of the housing and the outward protrusion of the center pole are arranged under the preload. When the center pole is displaced to the root-end side, therefore, the load to compress the first piezoelectric element increases. On the other hand, the load to compress the second piezoelectric element decreases. In short, the configuration is made such that the outward protrusion of the center pole can increase the compressive stress of the first piezoelectric element and decrease the compressive stress of the second piezoelectric element at the same time. It goes without saying that the relation is reversed in case the center pole is displaced to the leading-end side.

In this glow plug having the combustion pressure detecting function, moreover, the preload is applied such that the inward protrusion and the confronting portion of the housing clamp the first piezoelectric element, the second piezoelectric element and the outward protrusion of the center pole positioned inbetween. Therefore, the preload can be applied simultaneously to the two piezoelectric elements, and the first piezoelectric element and the second piezoelectric element piled one over the other so that the preloads of the same magnitude can be applied at the time of manufacturing the glow plug. Moreover, the two faces (i.e., the leading-end outward protruding face and the root-end outward protruding face) of the outward protrusion of the center pole so that the configuration of the center pole is simplified. As a result, this glow plug; having the combustion pressure detecting function can have a relatively simple configuration and can lower the cost and reduce the size.

Like the glow plug having the combustion pressure detecting function according to the aforementioned invention, the glow plug having the combustion pressure detecting function of the invention has the first piezoelectric element and the second piezoelectric element arranged such that the load to compress the first piezoelectric element in the axial direction increases whereas the load to compress the second piezoelectric element in the axial direction decreases, when the center pole is displaced to the root-end side. If, therefore, the two piezoelectric elements are likewise connected in this glow plug having the combustion pressure detecting function, an output of two times as high as that of the case using one piezoelectric element can be obtained to lighten the influences of the magnitude of the fastening torque on the sensitivities of the piezoelectric elements.

In this glow plug having the combustion pressure detecting function, still moreover, it is possible to reduce the fluctuation of the detection output due to the electrically focusing effect.

In the glow plug with the combustion pressure detecting function thus far described, the first piezoelectric element and the second piezoelectric element are piezoelectric elements having characteristics identical to each other.

In the glow plug having the combustion pressure detecting function of the invention, the first piezoelectric element and the second piezoelectric element have characteristics identical to each other. If, therefore, the first piezoelectric element and the second piezoelectric element make similar temperature changes, the charges to be produced by the electrically focusing effect on the 1-1 face of the first piezoelectric element and on the 2-2 face of the second piezoelectric element are of the opposite polarities and in equal quantities. Likewise, the charges to be produced by the electrically focusing effect on the 1-2 face of the first piezoelectric element and on the 2-1 face of the second piezoelectric element are of the opposite polarities and in equal quantities. Therefore, this glow plug having the combustion pressure detecting function produces the charges of such quantities on the first piezoelectric element and the second piezoelectric element by the electrically focusing effect at to just cancel each other. If, therefore, the 1-1 face and the 2-2 face are connected whereas the 1-2 face and the 2-1 face are connected, it is possible to sufficiently suppress the influences on the charge productions of the outputs of the first and second piezoelectric elements by the electrically focusing effect. Thus, it is possible to provide the glow plug having the combustion pressure detecting function, which can sufficiently suppress the influences due to the electrically focusing effect thereby to detect the combustion pressure properly.

The glow plug with the combustion pressure detecting function thus far described may further comprise at least either of: a first conductive path member for conducting the 1-1 face of the first piezoelectric element and the 2-2 face of the second piezoelectric element to each other; and a second conductive path member for conducting the 1-2 face of the first piezoelectric element and the 2-1 face of the second piezoelectric element, and the first conductive path has a bridge portion spanning between the two faces to be conducted, on the radially outer sides of the two faces for conducting the two faces.

The glow plug having the combustion pressure detecting function of the invention is equipped with at least one of the first conductive path member for conducting the 1-1 face and the 2-2 face, and the second conductive path member for conducting the 1-2 face and the 2-1 face. Moreover, the first conductive path member and the second conductive path member have the bridge portion spanning between the two conductive faces (i.e., the 1-1 face and the 2-2 face, or the 1-2 face and the 2-1 face) on the radially outer side. If, therefore, the lead wires are connected with the bridge portion and are led to the outside, the charges of the two faces can be easily derived to the outside.

In the glow plug with the combustion pressure detecting function thus far described, each of the first conductive path member, and the second conductive path member includes: a first member having a first abutting portion for abutting against one of the two faces to be conducted by itself, and a first bridge forming portion extracted radially outward from the first face abutting portion for forming at least part of the bridge portion, and a second member having a second abutting portion for abutting against the other of the two faces to be conducted by itself, and a second bridge forming portion extracted radially outward from the second face abutting portion for forming the bridge portion together with the first bridge forming portion.

In case the first conductive path member and the second conductive path member are composed of a single member, the length of the bridge portion to span between the two faces may have to be larger than the length required after the assembly, considering the assembly of the glow plug having the combustion pressure detecting function. If the bridge portion is made to have the length necessary for the assembly, its length may be excessive after the assembly. The bridge portion having the excessive length may contact with the housing or another portion and may become short so that it cannot detect the combustion pressure properly.

In the glow plug having the combustion pressure detecting function of the invention, on the contrary, the first conductive path member and the second conductive path member are individually made of the first member and the second member. Moreover, the first member includes the first face abutting portion for abutting against one of the two faces (e.g., the 1-1 face and the 2-2 face, or the 1-2 face and the 2-1 face) conducted to the first conductive path member or the second conductive path member itself, and the first bridge forming portion extracted radially outward from the first face abutting portion and forming at least part of the bridge portion. On the other hand, the second member includes the second face abutting portion for abutting against the other of the two faces conducted to the first conductive path member or the second conductive path member itself, and the second bridge forming portion extracted radially outward from the second face abutting portion and forming the bridge portion together with the first bridge forming portion.

Thus, the first conductive path member and the second conductive path member are composed of the first member and the second member. Therefore, the assembly of the first conductive path member and the second conductive path member can be facilitated, and the bridge portion can be formed of the first bridge forming portion and the second bridge forming portion. Thus, the short-circuit with the housing or the like can be easily prevented by adjusting the length or shape of the bridge portion properly.

In the glow plug with the combustion pressure detecting function thus far described, the first piezoelectric element and the second piezoelectric element are insulated from the center pole and the housing.

The first piezoelectric element and the second piezoelectric element do not necessarily have to be insulated from the center pole or the housing. For example, both the 1-2 face of the first piezoelectric element and the 2-1 face of the second piezoelectric element are arranged conductive to the housing, whereas the outputs can be obtained from the 1-1 face of the first piezoelectric element and the 2-2 face of the second piezoelectric element. In short, it is possible to commonly use the housing conducted to the engine block and set at the earth level, the 1-2 face of the first piezoelectric element and the 2-1 face of the second piezoelectric element.

However, the glow plug feeds an electric current as high as several tens to 100 amperes at the starting time or at the after glow energizing time so that the earth level fluctuates at the time of energizing the glow plug. As a result, the outputs from the 1-1 face and the 2-2 face are caused to fluctuate by the fluctuations of the earth level, and the proper measurement of the combustion pressure may become difficult.

In the glow plug having the combustion pressure detecting function of the invention, on the contrary, the first piezoelectric element and the second piezoelectric element are insulated from the center pole and the housing. Therefore, the outputs of the first piezoelectric element and the second piezoelectric element take such levels as float not only from the earth level in the housing but also from the heater voltage level in the center pole. As a result, the output levels are not influenced by the fluctuations of the earth level, as caused by energizing the glow plug.

In the glow plug having the combustion pressure detecting function thus far described, the charges to be produced on the two faces of one pair of the 1-1 face of the first piezoelectric element and the 2-2 face of the piezoelectric element, and the 1-2 face of the piezoelectric element and the 2-1 face of the second piezoelectric element may be derived to the outside while being insulated from the center pole and the housing, and the charges to be produced on the two faces of the other pair may be derived to the outside through the housing.

In the glow plug having the combustion pressure detecting function of the invention, the paired faces of either the 1-1 face and the 2-2 face or the 1-2 face and the 2-1 face are insulated from the center pole or the housing and are extracted to the outside. The remaining paired faces are conducted to the housing. In other words, the other two faces are set to the earth level of the housing.

When the high current is fed to the glow plug at the starting time or the after glow energizing time, as has been described hereinbefore, the earth level may fluctuate to cause the output fluctuation. If this problem can be separately avoided by the measuring circuit or the like, there arise advantages that the number of lead wires to be led to the outside can be reduced, and that the configuration around the piezoelectric elements can be simplified to provide an inexpensive glow plug.

In the glow plug with the combustion pressure detecting function thus far described, moreover, the housing may further include: a housing leading-end portion positioned on the most leading-end side of the axial direction; a housing root-end portion positioned on the most root-end side of the axial direction; an externally threaded portion positioned between the housing leading-end portion and the housing root-end portion for screwing the housing in the mounting hole of the internal combustion engine; and a tool engaging portion positioned between the housing root-end portion and the externally threaded portion for engaging with a tool at the screwing, and the first piezoelectric element and the second piezoelectric element may be arranged in the housing root-end portion.

The tool engaging portion in the glow plug having the combustion pressure detecting function is brought into engagement with the tool for fastening the glow plug in the internal combustion engine. Therefore, the tool engaging portion has to be made so thick as to avoid any deformation. In the mode, however, where the piezoelectric elements are arranged on the radially inner side of the tool engaging portion, the tool engaging portion is liable to become thin so that its strength is lowered and deformed.

In the glow plug having the combustion pressure detecting function of the invention, on the contrary, the first piezoelectric element and the second piezoelectric element are arranged in the housing root-end portion closer to the root-end than the tool engaging portion. Therefore, the sizes such as the thickness of the tool engaging portion can be selected without being influenced by the sizes and arrangements of the first piezoelectric element and the second piezoelectric element so that the tool engaging portion can be highly strong.

Moreover, the first piezoelectric element and the second piezoelectric element are arranged in the housing root-end portion so that they can be prevented, when handled, from being bit by the tool or the like. It is, therefore, possible to provide the glow plug having the combustion pressure detecting function, which can be easily handled when mounted and which has a high reliability.

Here, the tool engaging portion indicates the portion, which is so suitably shaped as to engage with the tool such as a spanner or wrench when the glow plug having the combustion pressure detecting function is to be mounted in or demounted from the internal combustion engine. Specifically, the tool engaging portion indicates a hexagonal portion or a double-faced portion.

In the glow plug having the combustion pressure detecting function thus far described, moreover, the housing may be sealed on its root-end side with a resin.

In the glow-plug having the combustion pressure detecting function of the invention, the housing is sealed on its root-end side with a resin. Therefore, the piezoelectric elements or the like arranged in the housing root-end portion can be protected against the moisture or oil. It is, therefore, possible to provide a more reliable glow plug having the combustion pressure detecting function.

The glow plug with the combustion pressure detecting function thus far described may further comprise: a ring-shaped sealing member having the center pole inserted therethrough, and the sealing member may be arranged on the leading-end side, as viewed in the axial direction, of the first piezoelectric element and the second piezoelectric element, for making the space, as located closer to the sides of the first piezoelectric element and the second piezoelectric element than the sealing member, between the outer side face of the center pole and the inner side face of the housing, gastight with respect to the space on the leading-end side of the sealing member.

In the glow plug having the combustion pressure detecting function of the invention, the ring-shaped sealing member is arranged on the leading-end side of the first piezoelectric element and the second piezoelectric element, as viewed in the axial direction, and the space, as located closer to the sides of the first piezoelectric element and the second piezoelectric element than the sealing member, between the outer side face of the center pole and the inner side face of the housing, is made gastight with respect to the space on the leading-end side of the sealing member. Even if the combustion gas invades from the leading-end side into the space between the center pole and the inner side face of the housing, the gas does not reach the portions of the first piezoelectric element and the second piezoelectric element. As a result, the first piezoelectric element and the second piezoelectric element do not receive the stress from the pressure of the combustion gas so that their outputs are not influenced. As a result, the glow plug having the combustion pressure detecting function of the invention can provide a proper combustion pressure detection output.

Here, the ring-shaped sealing member can be any if it can keep the space, as located closer to the sides of the first piezoelectric element and the second piezoelectric element than the sealing member, between the center pole and the inner side face of the housing, gastight against the space on the leading-end side of the sealing member. Specifically, the sealing member can be made of an O-ring of rubber such as fluorine rubber having a high heat resistance.

BRIEF DESCRIPTION OF THE DRAWINGS

FIGS. 1A and 1B show a glow plug having a combustion pressure detecting function according to Embodiment 1, wherein FIG. 1A is a half section of the entirety, and FIG. 1B is an enlarged longitudinal section of an essential portion near the leading end;

FIGS. 3A and 3B show the state, in which the glow plug having the combustion pressure detecting function according to Embodiment 1 is mounted in a mounting hole extending through the outer side of an internal combustion engine and the combustion chamber face, wherein FIG. 3A is a half section showing the entirety, and FIG. 3B is an enlarged longitudinal section of an essential portion near the leading end;

FIGS. 4A and 4B show the glow plug having the combustion pressure detecting function according to Embodiment 1, wherein FIG. 4A is a top plan view, and FIG. 4B is an explanatory view showing a configuration of a combustion pressure sensor;

FIGS. 5A and 5B show a sensor cap forming part of the housing of the glow plug having the combustion pressure detecting function according to Embodiment 1, wherein FIG. 5A is a top plan view, and FIG. 5B is a longitudinal section;

FIGS. 6A and 6B show a center pole sleeve forming part of the center pole of the glow plug having the combustion pressure detecting function according to Embodiment 1, wherein FIG. 6A is a top plan view, and FIG. 6B is a longitudinal section;

FIGS. 8A and 8B show an enveloping member of the glow plug having the combustion pressure detecting function according to Embodiment 1, wherein FIG. 8A is a top plan view, and FIG. 8B is a longitudinal section.

FIG. 11 is a graph showing relations between the crank angle of the internal combustion engine, as obtained by using the measuring system of FIG. 10, and the output of the glow plugs having the combustion pressure detecting function according to Embodiment 1 and Comparison 1;

FIGS. 12A and 12B showing a system for measuring the sensor output of the glow plug having the combustion pressure detecting function according to Embodiment 1 by using an air chamber, wherein FIG. 12A is an explanatory view of the entire system, and FIG. 12B is a timing chart showing the actions of an input valve and an output valve of the air chamber;

FIG. 13 is a graph showing relations between the individual fastening torques obtained by using the measuring system of FIGS. 12A and 12B and the magnitudes of the sensor outputs of the glow plugs having the combustion pressure detecting function according to Embodiment 1 and Comparisons 1 and 2;

FIGS. 15A, 15B and 15C show the changes in the quantities of charges produced from piezoelectric elements and in the temperatures of the piezoelectric elements in case the glow plugs having the combustion pressure detecting function are heated, wherein FIG. 15A presents comparison 1, FIG. 15B presents Comparison 2, and FIG. 15C presents Embodiment 1;

DESCRIPTION OF REFERENCE NUMERALS AND SIGNS

Figure 1A:
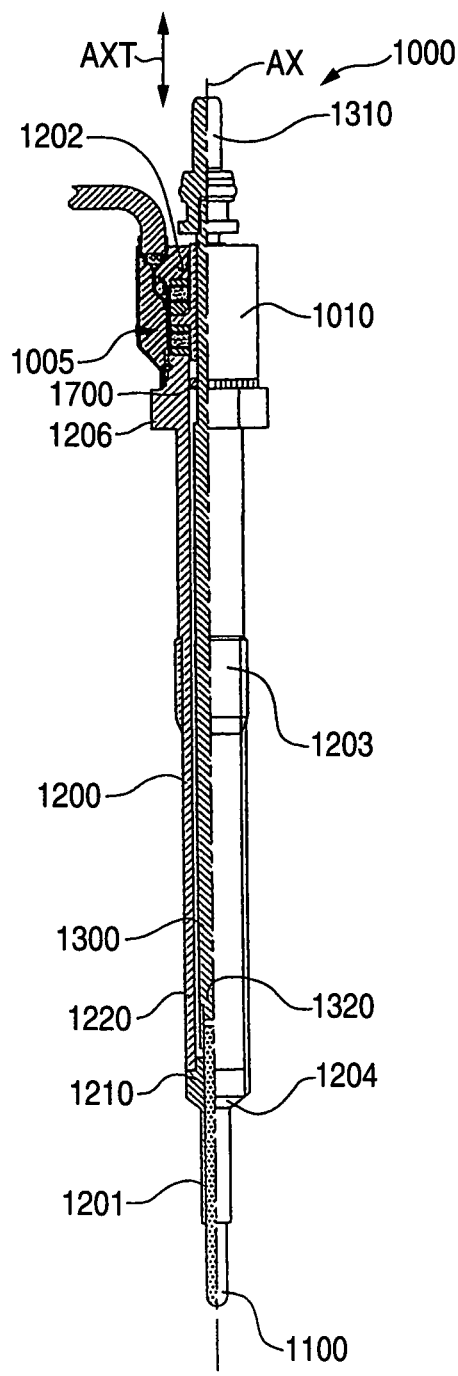

100 INTERNAL COMBUSTION ENGINE
1000, 2000, 5000, 6000 GLOW PLUG (GLOW PLUG WITH COMBUSTION PRESSURE DETECTING FUNCTION)
1005, 2005, 6005 COMBUSTION PRESSURE SENSOR
1100, 5101 HEATER MEMBER

5100 SHEATH MEMBER (HEATER MEMBER)
1150 HEATER CONNECTING PORTION
1200, 5200 HOUSING
1201, 5201 HOUSING LEADING-END PORTION
1202 HOUSING ROOT-END PORTION
1203 EXTERNALLY THREADED PORTION
1204, 5204 SEALING PORTION
1205 HEATER HOLDING PORTION
1206 TOOL ENGAGING PORTION
1207 INNER SIDE FACE (OF HOUSING)
1210 HEATER HOLDING MEMBER (HEATER HOLDING PORTION)
1221 CONFRONTING PORTION
1222 ROOT-END CONFRONTING FACE
1223 HOUSING BODY ROOT-END PORTION
1231, 6231 INWARD PROTRUSION
1234, 6234 LEADING-END INWARD PROTRUDING FACE
1300, 5300 CENTER POLE
1303 OUTER SIDE FACE (OF CENTER POLE)
1310 CENTER POLE ROOT-END PORTION
1320 CENTER POLE LEADING-END PORTION
1340, 6340 CENTER POLE SLEEVE
1342, 6342 OUTWARD PROTRUSION
1345, 6345 ROOT-END OUTWARD PROTRUDING FACE
1346, 6346 LEADING-END OUTWARD PROTRUDING FACE
1400, 2400 FIRST PIEZOELECTRIC ELEMENT
1410 1-1 FACE (FIRST PLUS FACE)
1420 1-2 FACE (FIRST MINUS FACE)
2410 FIRST INNER CIRCUMFERENCE (FIRST PLUS FACE)
2420 FIRST OUTER CIRCUMFERENCE (FIRST MINUS FACE)
2631 FIRST INNER CIRCUMFERENCE ELECTRODE
2641 FIRST OUTER CIRCUMFERENCE ELECTRODE
1500, 2500 SECOND PIEZOELECTRIC ELEMENT
1510 2-1 FACE (SECOND PLUS FACE)
1520 2-2 FACE (SECOND MINUS FACE)
2510 SECOND INNER CIRCUMFERENCE (SECOND PLUS FACE)
2520 SECOND OUTER CIRCUMFERENCE (SECOND MINUS FACE)
2633 SECOND INNER CIRCUMFERENCE ELECTRODE
2643 SECOND OUTER CIRCUMFERENCE ELECTRODE
1630 FIRST ELECTRODE MEMBER (FIRST CONDUCTIVE PATH MEMBER)
1640, 6640 SECOND ELECTRODE MEMBER (SECOND CONDUCTIVE PATH MEMBER)
1631 1-1 ELECTRODE PORTION (FIRST FACE ABUTTING PORTION)
1633 2-2 ELECTRODE PORTION (SECOND FACE ABUTTING PORTION)
1641, 6641 1-2 ELECTRODE PORTION (FIRST FACE ABUTTING PORTION)
1643, 6643 2-1 ELECTRODE PORTION (SECOND FACE ABUTTING PORTION)
1632 FIRST CONNECTING PORTION (BRIDGE PORTION)
1642, 6647 SECOND CONNECTING PORTION (BRIDGE PORTION)
1700 O-RING (SEALING MEMBER)
6642 FIRST EXTENSION
6644 SECOND EXTENSION
6645 1-2 ELECTRODE MEMBER (SECOND CONDUCTIVE PATH MEMBER)
6646 2-1 ELECTRODE MEMBER (SECOND CONDUCTIVE PATH MEMBER)
AX AXIS
AXT AXIAL DIRECTION
PL PRELOAD
PLT POLARIZING DIRECTION

DETAILED DESCRIPTION OF THE INVENTION

A glow plug with a combustion pressure detecting function according to an embodiment of the invention will be described with reference to the accompanying drawings.

[Embodiment 1]

First of all, a first embodiment of the invention is described with reference to FIGS. A glow plug 1000 is one capable of heating a heater member 1100 for aiding, when energized, in the start of an internal combustion engine, and having a combustion pressure sensor 1005 configured to detect the change in the combustion pressure of the internal combustion engine. This glow plug 1000 is equipped, as shown in FIG. 1A, with: a cylindrical housing 1200 extending in a direction AXT (as will be simply called the "axial direction") along an axial line AX; a conductive center pole 1300 held in the housing 1200; and the heater member 1100 arranged on the axially leading-end side (as located on the lower side and will be simply called the "leading-end side") of the center pole 1300.

Figure 1B:
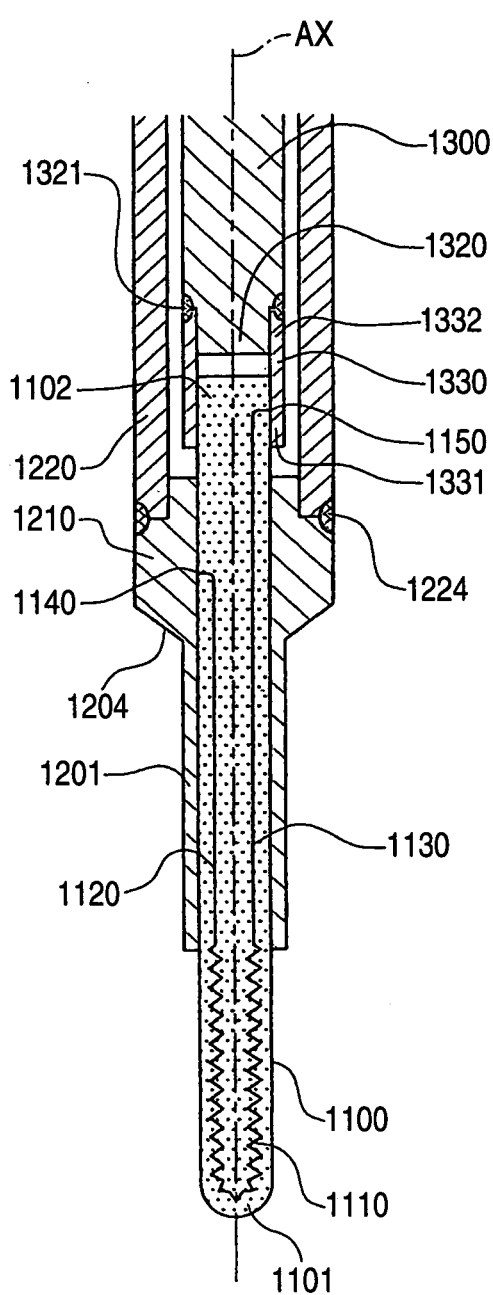

As shown in FIG. 1B, this heater member 1100 is formed to have a substantially semispherical shape at a heater leading-end portion 1101 and to have a rod shape made of ceramics of silicon nitride. This heater member 1100 is equipped in its heater leading-end portion 1101 with a heater heating portion 1110 made of a non-metallic heating element. Moreover, the heater member 1100 is equipped on the outer circumference of its root-end side with heater connecting portions 1140 and 1150 acting as power-feeding terminals necessary for heating the heater heating portion 1110. The heater member 1100 is further equipped with heater conductors 1120 and 1130 for conducting the two ends of the heater heating portion 1110 and the heater connecting portions 1140 and 1150, respectively. These components are enclosed with ceramics of silicon nitride.

Figure 2:
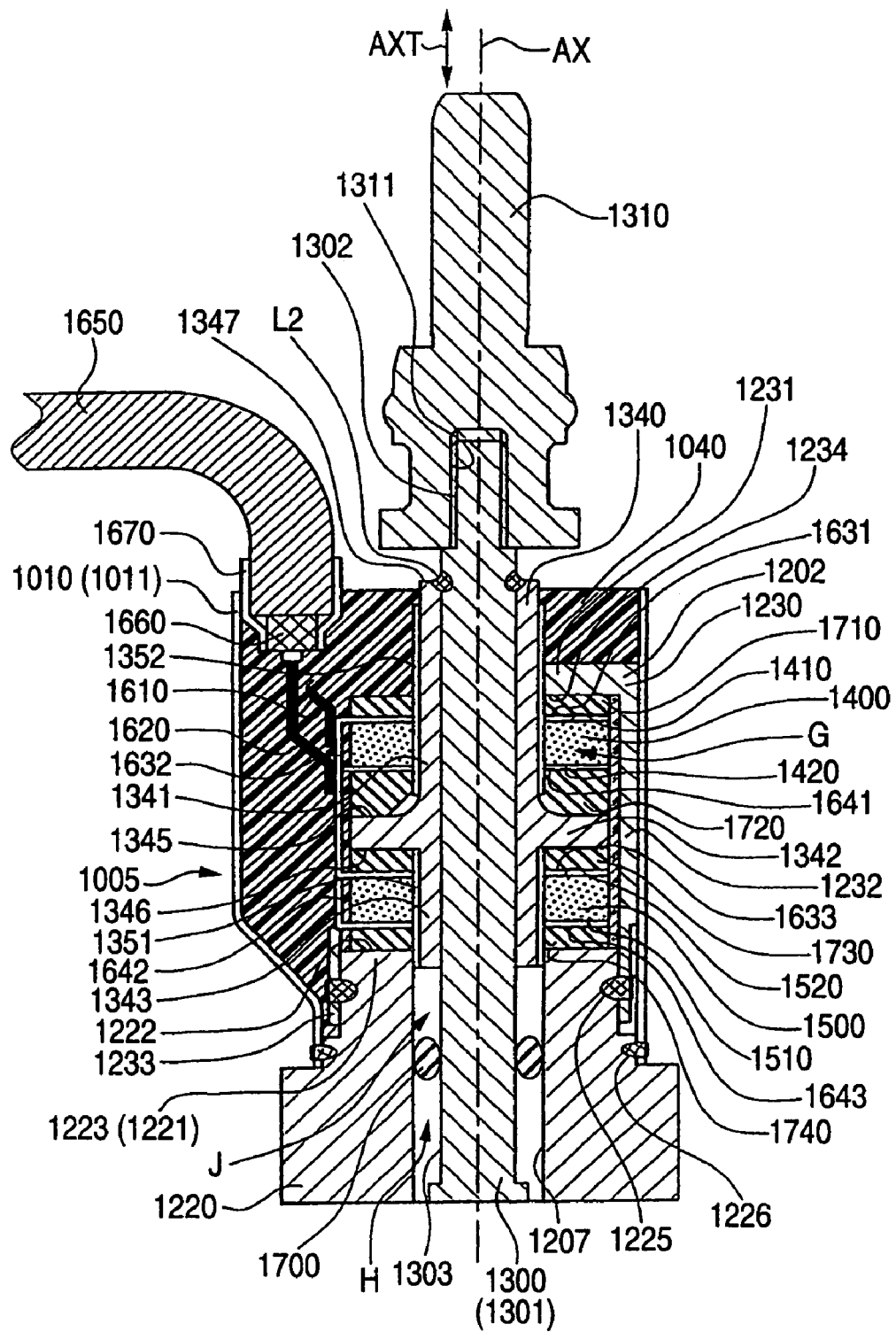
FIG. 2 is an enlarged longitudinal section showing a portion near the root end of the glow plug having the combustion pressure detecting function according to Embodiment 1 in an enlarged scale.

As shown in FIG. 1A, FIG. 1B and FIG. 2, on the other hand, the housing 1200 is composed of: a cylindrical housing body member 1220; a heater holding member 1210 arranged on the leading-end side of the housing body member 1220 for holding the aforementioned heater member 1100; and a sensor cap 1230 (as referred to FIG. 2) arranged at the root-end of the housing body member 1220.

Of these components, the heater holding member 1210 and the housing body member 1220 are fixed, as shown in FIG. 1B, by a laser-welding at a leading-end side welded portion 1224, which is positioned on the leading-end side (as located on the lower side of FIG. 1A) of the housing body member 1220. Moreover, the housing body member 1220 and the sensor cap 1230 are fixed by a laser-welding at a root-end side first welded portion 1225, which is positioned on the axial root-end side (as located on the upper side of FIG. 2, as will be simply called the root-end side) of the housing body member 1220.

In the housing 1200 thus composed of the three members, the portion on the most leading-end side is called a housing leading-end portion 1201, and the portion on the most root-end side is called a housing root-end portion 1202.

Figure 3A:
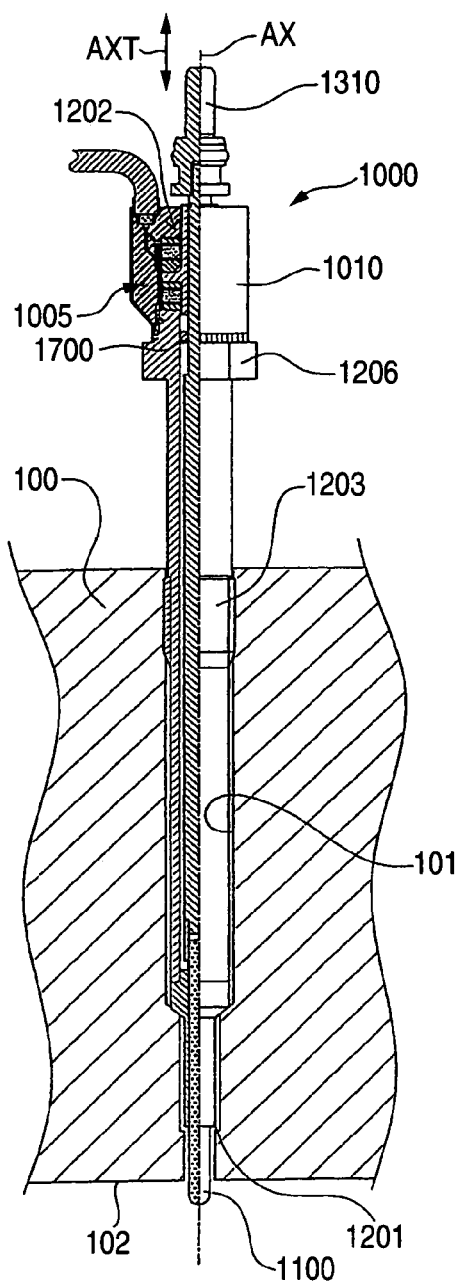
Figure 3B:
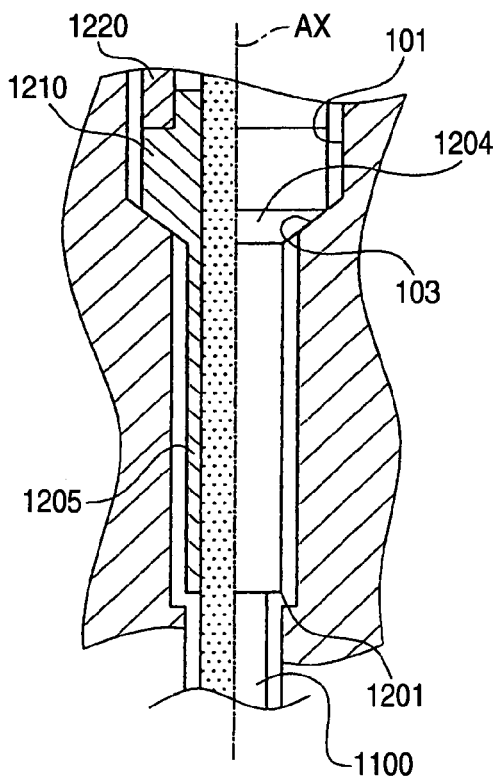

This housing 1200 is equipped, between the housing leading-end portion 1201 and the housing root-end portion 1202, i.e., at an axial intermediate portion of the housing body member 1220, with an externally threaded portion 1203 for mounting the housing 1200 in a mounting hole 101 of an internal combustion engine 100, as shown in FIG. 3A. Moreover, the housing body member 1220 of the housing 1200 is equipped, between the housing root-end portion 1202 and the externally threaded portion 1203, with a hexagonal tool engaging portion 1206 for engaging with a wrench at a screwing time. Still moreover, the housing 1200 is equipped, between the housing leading-end portion 1201 and the externally threaded portion 1203, i.e., at the root-end portion of the heater holding member 1210, with a sealing portion 1204 having a converging taper face and pressed to contact with a mounting face 103 of the mounting hole 101 thereby to hold the housing 1200 and the mounting hole 101 gastight. As apparent from FIG. 1A, therefore, the heater holding member 1210 is positioned on the axially leading-end side of the externally threaded portion 1203.

On the other hand, the heater holding member 1216 holds the heater member 1100 such that its heater leading-end portion 1101 protrudes from the housing leading-end portion 1201 to the leading-end side. In the heater holding member 1210, more specifically, a heater root-end portion 1102 positioned on the root-end side of the heater member 1100 is press-fitted in a heater holding portion 1205. As a result, the beater holding member 1210 and the heater member 1100 make gastight contact so that the combustion gas under a high pressure is prevented from invading into the housing 1200 even in case the glow plug 1000 is mounted in the internal combustion engine 100.

Moreover, the heater connecting portion 1140 of the heater member 1100 and the inner circumference of the heater holding member 1210 are made electrically conductive so that the heater heating portion 1110 of the heater member 1100 is electrically connected at its one end with the housing 1200.

Of the heater member 1100, on the other hand, the heater root-end portion 1102 is press-fitted in a connecting ring leading-end portion 1331 of a connecting ring 1330 made of a metal. Moreover, a center pole leading-end portion 1320 of the center pole 1300 is inserted into the inner circumference of a connecting ring root-end portion 1332 of the connecting ring 1330 and is fixed at a center pole leading-end welded portion 1321. As a result, the center pole 1300 and the heater member 1100 are jointed mechanically rigidly through the connecting ring 1330.

The center pole 1300 and the heater connecting portion 1150 of the heater member 1100 are electrically connected through the connection ring 1330.

Therefore, the heater member 1100 can be heated by applying a voltage between the housing 1200 and the center pole 1300.

Here is described the housing root-end portion 1202 which is located closest to the root-end side of the housing 1200. This housing root-end portion 1202 includes the sensor cap 1230 and a housing body root-end portion 1223 of the housing body member 1220.

Figure 5A:
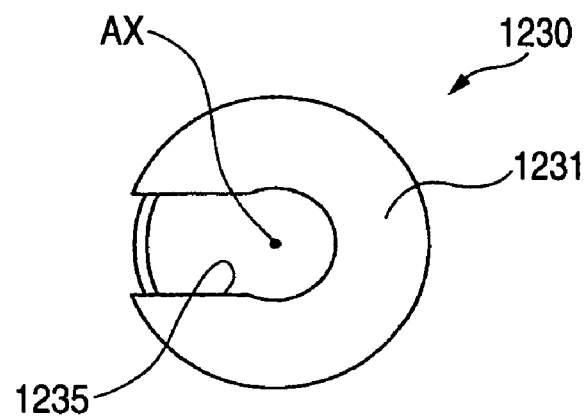
Figure 5B:
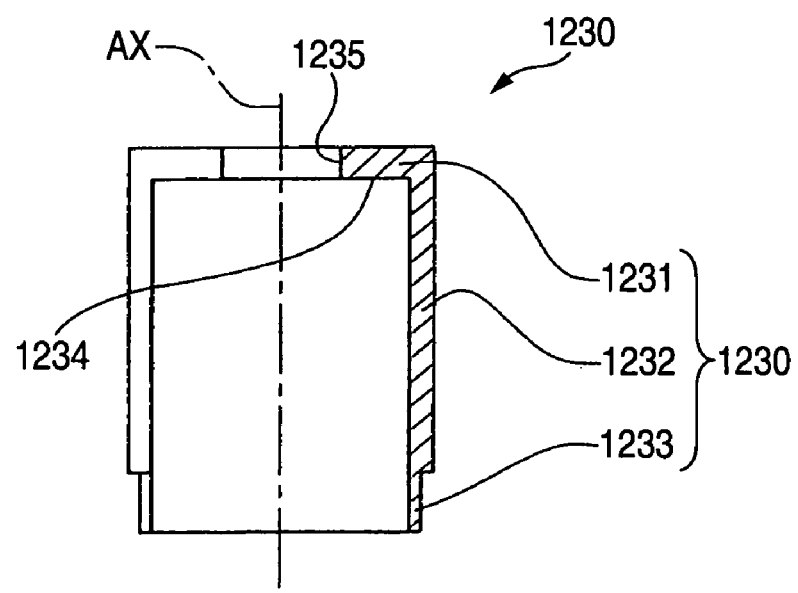

Of these, the sensor cap 1230 is equipped, as shown in FIG. 5B, with a trunk portion 1232 having a substantially cylindrical shape and an annular portion 1233, which is positioned on the axial leading-end side (as located on the lower side) of the trunk portion 1232. The sensor cap 1230 is further equipped with an inward protrusion 1231, which protrudes in the direction normal to the axis AX and radially inward from the axial root end (as located at the upper end of FIG. 5B) of the trunk portion 1232. Moreover, this inward protrusion 1231 contains a leading-end confronting inward protruding face 1234 confronting the axial leading-end side. On the other hand, the annular portion 1233 is made thinner than the trunk portion 1232.

On the other hand, the trunk portion 1232 and the inward protrusion 1231 have a through hole 1235 for passing the center pole 1300 therethrough along its axis AX and for passing the later-described wiring members therethrough. This through hole 1235 is formed, as shown in FIG. 5A, into a substantially U-shaped top plan view containing the axis AX, and has an axially extending slit shape in the trunk portion 1232.

Here, the sensor cap 1230 and the housing body root-end portion 1223 are fixed (as referred to FIG. 2) at the root-end side first welded portion 1225, as has been described hereinbefore. As a result, the inward protrusion 1231 and the trunk portion 1232 of the sensor cap 1230 and the housing body root-end portion 1223 define an enclosing space G for housing the later-described combustion pressure sensor 1005 therein.

The housing body root-end portion 1223, as positioned on the leading-end side of the enclosing space G, constitutes a confronting portion 1221, which confronts the inward protruding face 1234 of the inward protrusion 1231. On the other hand, the confronting portion 1221 contains a confronting face 1222 acting as the root-end face of the housing body member 1220 and confronting the axial root-end side. This root-end confronting face 1222 confronts the inward protruding face 1234 of the sensor cap 1230.

Next, the center pole 1300 is described with reference to FIG. 1A, FIG. 1B and FIG. 2. This center pole 1300 is formed of iron into the rod shape and is arranged in the housing 1200. This center pole 1300 is composed of a center pole root-end portion 1310 positioned on the root-end side, and a center pole body 1301 having a rod shape extending from the center pole root-end portion 1310 to the leading-end side. Of these, the center pole root-end portion 1310 is internally threaded at 1311 on its leading-end side. On the other hand, the center pole body 1301 is externally threaded at 1302 on its root-end side. The center pole root-end portion 1310 and the center pole body 1301 are screwed at the internally threaded portion 1311 and the externally threaded portion 1302 and are caulked to each other (as referred to FIG. 2).

In this center pole 1300, the center pole leading-end portion 1320 is jointed mechanically rigidly, as has been described hereinbefore, to the heater root-end, portion 1102 of the heater member 1100 through the connecting ring 1330 (as referred to FIG. 1B). On the other hand, the center pole root-end portion 1310 or the end portion of the center pole 1300 on the root-end side is positioned on the root-end side of the housing root-end portion 1202 (i.e., the sensor cap 1230), and protrudes from the housing 1200 to the root-end side so that it can be connected by fitting it in the not-shown connecting terminal.

Figure 6A:
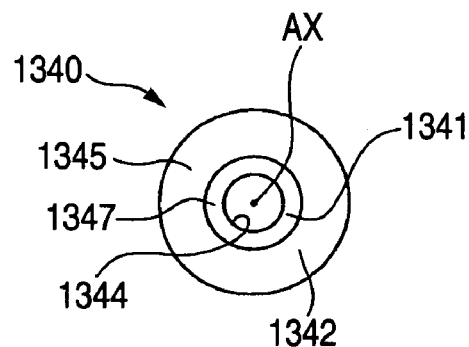
Figure 6B:
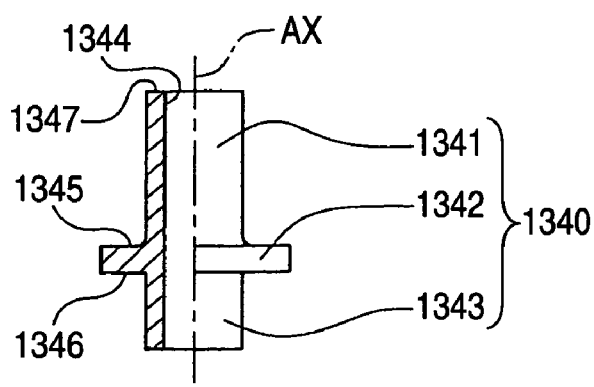

Moreover, the center pole 1300 is equipped, on the leading-end side (as located on the lower side of the drawing) of the center pole root-end portion 1310, with not only the column-shaped center pole body 1301 but also a center pole sleeve 1340 integrated with the former. This center pole sleeve 1340 is formed into a cylindrical shape having a through hole 1344, as shown in FIG. 6A and FIG. 6B, and is equipped, at its axial intermediate portion, with a flange-shaped outward protrusion 1342 protruding radially outward. In the following, the center pole sleeve 1340 is divided across the outward protrusion 1342 into a first cylindrical portion 1341 positioned on the axial root-end side and a second cylindrical portion 1343 position on the leading-end side.

Here, the outward protrusion 1342 of the center pole sleeve 1340 is equipped with a root-end confronting outward protruding face 1345 confronting the axial root-end side and a leading-end confronting outward protruding face 1346 confronting the axial leading-end side. Moreover, insulating tubes 1352 and 1351 are arranged on the outer circumferences of the first cylindrical portion 1341 and the second cylindrical portion 1343, respectively.

With reference to FIG. 3A, FIG. 3B, FIG. 4A and FIG. 4B, here is described the combustion pressure sensor 1005, which is formed in the housing root-end portion 1202 of the housing 1200.

This combustion pressure sensor 1005 is equipped with not only the sensor cap 1230, the center pole sleeve 1340, the housing body root-end portion 1223 (or the confronting portion 1221) of the housing body member 1220 but also two or first and second two piezoelectric elements 1400 and 1500, four or first, second, third and fourth insulating spacers 1710, 1720, 1730 and 1740, first and second electrode members 1630 and 1640, and the insulating tubes 1352 and 1352.

Figure 4A:
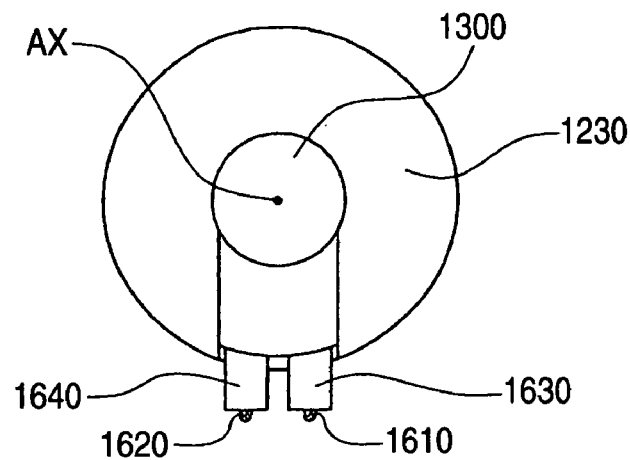
Figure 4B:
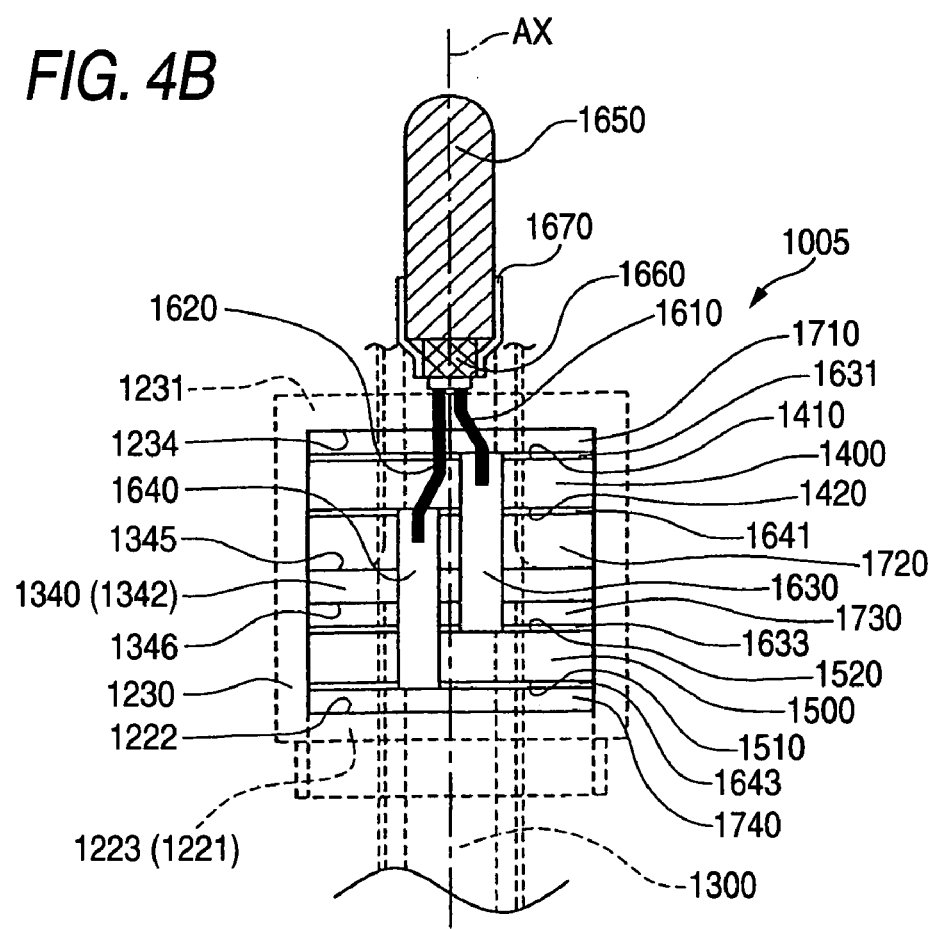

At the center of this combustion pressure sensor 1005, as shown in FIG. 2 and FIG. 4B, there is arranged the center pole sleeve 1340, which has the center pole body 1301 inserted and fixed therein. This center pole sleeve 1340 is so arranged that the outward protrusion 1342 is positioned on the leading-end side (as located on the lower side of FIG. 4B) of the inward protrusion 1231 of the housing 1200 (or the sensor cap 1230) and on the root-end side (as located on the upper side of FIG. 4B) of the confronting portion 1221 (or the housing body root-end portion 1223) of the housing 1200 (or the housing body member 1220). Of the center pole sleeve 1340, moreover, the first cylindrical portion 1341 extending from the outward protrusion 1342 to the root-end side extends and protrudes to the root-end side across the inward protrusion 1231 of the sensor cap 1230. Of the center pole sleeve 1340, still moreover, the second cylindrical portion 1343 extending from the outward protrusion 1342 to the leading-end side extends over the root-end confronting face 1222 of the confronting portion 1221 to the leading-end side so that its portion is inserted into the housing body member 1220.

At first, here is described that portion of the combustion pressure sensor 1005, which is defined by the leading-end inward protruding face 1234 of the inward protrusion 1231 and the root-end outward protruding face 1345 of the outward protrusion 1342.

On the leading-end side (as located on the lower side of FIG. 2 and FIG. 4B) of the leading-end inward protruding face 1234 of the inward protrusion 1231, there is so arranged the first insulating spacer 1710 formed of alumina ceramics into a ring shape as has the first cylindrical portion 1341 of the center pole sleeve 1340 inserted thereinto.

Figure 7:
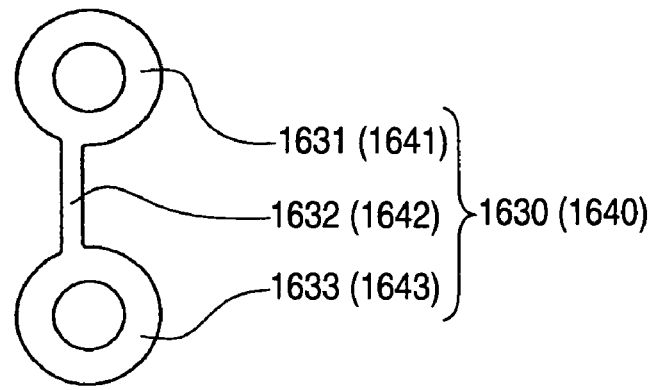
FIG. 7 is an explanatory view showing electrode members of the glow plug having the combustion pressure detecting function according to Embodiment 1.

On the leading-end side of the first insulating spacer 1710, there is arranged a ring-shaped 1-1 electrode portion 1631, which forms part of the first electrode-member 1630 (as referred to FIG. 7) made of an iron-nickel alloy and which has the first cylindrical portion 1341 of the center pole sleeve 1340 inserted thereinto.

Here, the first electrode member 1630 includes the two ring-shaped electrode portions, i.e., the 1-1 electrode portion 1631 and a 2-2 electrode portion 1633, and a first connecting portion 1632 connecting the electrode portions 1631 and 1633.

Likewise, the later-described second electrode member 1640 includes the two ring-shaped electrode portions, i.e., a 1-2 electrode portion 1641 and a 2-1 electrode portion 1643, and a second connecting portion 1642 connecting the connecting portions 1641 and 1642.

On the leading-end side of the 1-1 electrode portion 1631, moreover, there is arranged the ring-shaped first piezoelectric element 1400, which is composed mainly of lead titanate-zirconate and which has the first cylindrical portion 1341 of the center pole sleeve 1340 inserted thereinto. This first piezoelectric element 1400 is so polarized in its own axial direction as to generate, when it receives a compressive stress in the axial direction, a plus charge on its one end face or a 1-1 face 1410 and a minus charge on its other end face or a 1-2 face 1420 in response to a change in that stress.

Here, the first piezoelectric element 1400 is so arranged that its 1-1 face 1410 is directed on the root-end side (as located on the upper side of the drawing) to abut against the 1-1 electrode portion 1631. In this embodiment, moreover, no electrode layer is formed on the 1-1 face 1410 and the 1-2 face 1420 of the first piezoelectric element 1400. However, it is arbitrary to form an electrode layer.

On the leading-end side of the first piezoelectric element 1400, moreover, there is so arranged the ring-shaped 1-2 electrode portion 1641 which forms part of the aforementioned second electrode member 1640 and which has the ring-shaped 1-2 electrode portion 1641 of the center pole sleeve 1340 inserted thereinto, as to abut against the 1-2 electrode portion.

Between this 1-2 electrode portion 1641 and the outward protruding face 1345 of the outward protrusion 1342, moreover, there is arranged the ring-shaped second insulating spacer 1720, which is made of alumina ceramics. On the other hand, the outer circumference of the first cylindrical portion 1341 of the center pole sleeve 1340 is enclosed with the insulating tube 1352.

Thus, the first piezoelectric element 1400, the 1-1 electrode portion 1631 of the first electrode member 1630, and the 1-2 electrode portion 1641 of the second electrode member 1640 are so clamped between the inward protrusion 1231 of the sensor cap 1230 and the outward protrusion 1342 of the center pole sleeve 1340 that they are insulated therefrom by the first and second insulating spacers 1710 and 1720 and the insulating sleeve 1352.

Here is described that portion of the combustion pressure sensor 1005, which is defined by the leading-end confronting outward protruding face 1346 of the outward protrusion 1342 and the root-end confronting face 1222 of the confronting portion 1221.

On the leading-end side of the leading-end confronting outward protruding face 1346 of the outward protrusion 1342, there are so arranged the ring-shaped third insulating spacer 1730 made of alumina ceramics and the ring-shaped 2-2 electrode portion 1633 forming part of the first electrode member 1630 that both have the second cylindrical portion 1343 of the center pole sleeve 1340 inserted thereinto.

On the leading-end side of the 2-2 electrode portion 1633, moreover, there is arranged the ring-shaped second piezoelectric element 1500, which has the same shape and characteristics as those of the first piezoelectric element 1400 and which has the second cylindrical portion 1343 of the center pole sleeve 1340 inserted thereinto.

This second piezoelectric element 1500 is also so polarized in its own axial direction as to produce, when it receives a compressive stress in the axial direction, a plus charge on its one end face or a 2-1 face 1510 and a minus charge on its other end face or a 2-2 face 1520 in response to a change in that stress.

Here in this embodiment, the second piezoelectric element 1500 is arranged to have its 2-2 face 1520 confronting the root-end side (as located on the upper side of the drawing). As in the first piezoelectric element 1400, moreover, the second piezoelectric element 1500 has its 2-1 face 1510 and 2-2 face 1520 formed to have no electrode layer.

On the leading-end side of this second piezoelectric element 1500, moreover, there is arranged the ring-shaped 2-2 electrode portion 1643, which forms part of the second electrode member 1640. On the leading-end side, on the other hand, there is also arranged the ring-shaped insulating spacer 1740, which is made of alumina ceramics. On the other hand, the outer circumference of the second cylindrical portion 1343 of the center pole sleeve 1340 is enclosed with the insulating tube 1351.

Thus, the second piezoelectric element 1500, the 2-2 electrode portion 1633 of the first electrode member 1630, and the 2-1 electrode portion 1643 of the second electrode member 1640 are so clamped between the outward protrusion 1342 of the center pole sleeve 1340 and the confronting portion 1221 of the housing body member 1220 that they are insulated therefrom by the third and fourth insulating spacers 1730 and 1740 and the insulating sleeve 1351.

In the combustion pressure sensor 1005, the annular portion 1233 of the sensor cap 1230 is so laser-welded all over its circumference at the root-end side first welded portion 1225 to the outer circumference of the housing body root-end portion 1220 that a pushing force toward the axial leading-end direction is applied to the sensor cap 1230, namely, that an axial compressive force is applied to the first and second piezoelectric elements 1400 and 1500. In this combustion pressure sensor 1005, therefore, a compressive preload is always applied in the axial direction to the first piezoelectric element 1400 and the second piezoelectric element 1500. At this laser-welding time, beads (i.e., radially outward bulges) are formed at the annular portion 1233. An enclosing member 1010 may interfere, when assembled with the outer side of the sensor cap 1230, with the beads so that they cannot be properly assembled. Therefore, the annular portion 1233 is made so thin that it may not interfere with the enclosing member 1010 when this enclosing member 1010 is to be assembled, even with such beads.

As a result, the inward protrusion 1231, the first insulating spacer 1710, the 1-1 electrode portion 1631, the first piezoelectric element 1400, the 1-2 electrode portion 1641, the second insulating spacer 1720, the outward protrusion 1342, the third insulating spacer 1730, the 2-2 electrode portion 1633, the second piezoelectric element 1500, the 2-1 electrode portion 1643, the insulating spacer 1740 and the confronting portion 1221 are overlaid to make close contact with their upper and lower members, as shown in FIG. 2 and FIG. 4B.

Moreover, the center pole body 1301 and the center pole sleeve 1340 are also arc-welded (or argon-welded) at the root end 1347 of the first cylindrical portion 1341 at a portion L2 where the center pole sleeve 1340 and the center pole body 1301 are close to each other. As a result, the center pole sleeve 1340 and the center pole body 1301 are integrated with each other.

On the other hand, the charges (or the output signal), which are produced at the first piezoelectric element 1400 and the second piezoelectric element 1500, are extracted to the outside, as shown in FIG. 4B, by the first electrode member 1630, the second electrode member 1640, lead wires 1610 and 1620 and a cable 1650.

In the first piezoelectric element 1400, more specifically, the 1-1 face 1410 abuts against the 1-1 electrode portion 1631 of the first electrode member 1630, and the 1-2 face 1420 abuts against the 1-2 electrode portion 1641 of the second electrode member 1640. In the second piezoelectric element 1500, on the other hand, the 2-2 face 1520 abuts against the 2-2 electrode portion 1633 of the first electrode member 1630, and the 2-1 face 1510 abuts against the 2-1 electrode portion 1643 of the second electrode member 1640. Therefore, the 1-1 face 1410 of the first piezoelectric element 1400 and the 2-2 face 1520 of the second piezoelectric element 1500 are made conductive by the first electrode member 1630. Likewise, the 1-2 face 1420 of the first piezoelectric element 1400 and the 2-1 face 1510 of the second piezoelectric element 1500 are made conductive by the second electrode member 1640.

In addition, the first electrode member 1630 and the second electrode member 1640 are connected, as shown in FIG. 2, at the first and second connecting portions 1632 and 1642, respectively, with the lead wire 1610 and the lead wire 1620, respectively, by a spot-welding. Moreover, the lead wires 1610 and 1620 are extracted in an insulated state as the cable 1650 having an internal braid 1660 to the outside. Specifically, the input is made through the not-shown charge amplifier to a control device such as an ECU so that the change in the combustion pressure is detected.

In this cable 1650, on the other hand, the internal braid 1660 is caulked and fixed by a cable fixing member 1670, which is welded and fixed in a bulging portion 1011 of the later-described enclosing member 1010 (as referred to FIG. 8A and FIG. 8B). As a result, the first electrode member 1630 and the second electrode member 1640 are prevented from being deformed, and the lead wires 1610 and 1620 are prevented from coming out by the force which might otherwise be applied to the lead wires 1610 and 1620 by the pull of that cable 1650.

Figure 8A:
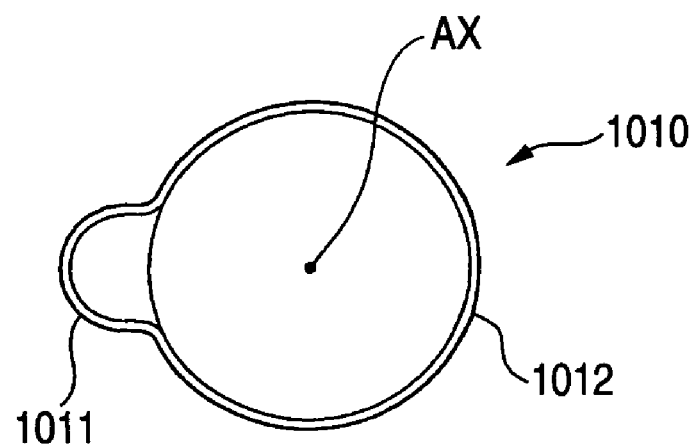
Figure 8B:
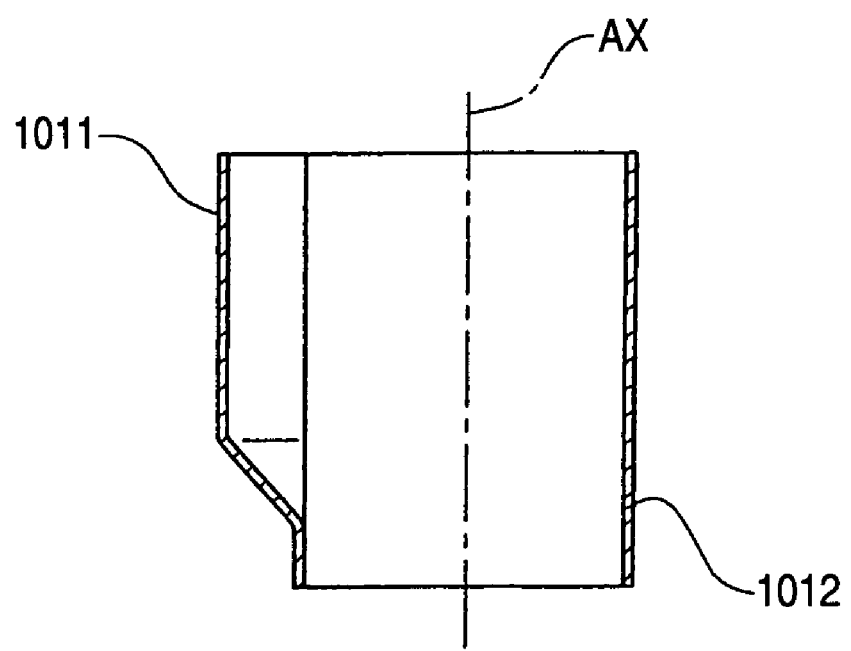

In the glow plug 1000 of this embodiment, as shown in FIG. 2, the housing root-end portion 1202 including the aforementioned combustion pressure sensor 1005 is enclosed by and housed in the cylindrical enclosing member 1010 (as referred to FIG. 8A and FIG. 8B). This enclosing member 1010 is composed, as shown in FIG. 8A and FIG. 8B, a substantially cylindrical cylinder portion 1012 and the bulging portion 1011 protruding radially outward from a circumferential portion of that cylinder portion 1012. This cylinder portion 1012 of the enclosing member 1010 encloses the individual members composing the combustion pressure sensor 1005. In the bulging portion 1011, moreover, there are enclosed the lead wires 1610 and 1620 which are connected with the first and second electrode members 1630 and 1640. Moreover, the enclosing member 1010 is filled therein with a resin 1040 from the root-end side so that the combustion pressure sensor 1005 is enclosed and sealed by that resin 1040. As a result, this glow plug 1000 can protect the combustion pressure sensor 1005 by preventing the invasion of moisture or oil from the root-end side, so that it can be highly reliable.

As shown in FIG. 2, on the other hand, a ring-shaped O-ring 1700 is arranged on the center pole 1300 (or the center pole body 1301) between the combustion pressure sensor 1005 (i.e., the first and second piezoelectric elements 1400 and 1500) and the externally threaded portion 1203 of the housing 1200, as seen in the axial direction AXT. This O-ring 1700 is made of fluorine rubber having a heat resistance and is compressed to come into close contact with the outer side face 1303 of the center pole 1300 (or the center pole body 1301) and the inner side face 1207 of the housing 1200. Of the formed between the outer side face 1303 of the center pole 1300 and the inner side face 1207 of the housing 1200, therefore, a space J on the root-end side (as located on the lower side of FIG. 2) of that O-ring 1700 is kept gastight against a space H on the leading-end side (as located on the lower side of FIG. 2). Here, the O-ring 1700 has an elasticity so that it does not obstruct the displacement of the center pole 1300 in the axial direction AXT due to the change in the combustion pressure.

In this embodiment, moreover, the O-ring 1700 is arranged, as viewed in the axial direction AXT, on the root-end side of the externally threaded portion 1203 of the housing 1200. Specifically, the O-ring 1700 is arranged, when mounted on the internal combustion engine 100, in a position protruding from the internal combustion engine 100. At this position, the heat generated in the internal combustion engine 100 is dissipated, while being transferred, so that the O-ring 1700 is kept at a relatively low temperature. As a result, it is advantageous that the O-ring 1700 is less deteriorated in the characteristics than the case, in which the O-ring 1700 is positioned on the leading-end side (as located on the lower side of FIG. 2) of the externally threaded portion, as taken in the axial direction AXT.

Here is described the case, in which the glow plug 1000 of this embodiment is mounted for use in the internal combustion engine 100.

This glow plug 1000 is mounted in the internal combustion engine 100, as shown in FIG. 3A, by inserting the glow plug 1000 into the mounting hole 101 of the internal combustion engine 100 and by screwing the externally threaded portion 1203 of the housing 1200 till the sealing portion 1204 is pressed to contact with the mounting face 103 formed near a combustion chamber 102.

Therefore, the tool is brought into engagement with the tool engaging portion 1206 formed on the housing 1200, thereby to apply a turning torque necessary for the fastening to the housing 1200. This tool engaging portion 1206 is arranged, as shown in FIG. 3A, on the leading-end side (as located on the lower side of the drawing) of the combustion pressure sensor 1005. Therefore, the tool engaging portion 1206 can be made thick without being influenced by the size or arrangement of the combustion pressure sensor 1005, so that it is not broken even if a strong fastening torque is applied. Moreover, the combustion pressure sensor 1005 is enclosed by the enclosing member 1010 so that it is prevented from being broken by the hit of a tool or the like when it is mounted or demounted.

This glow plug 1000 is fixed in the internal combustion engine 100 when the sealing portion 1204 having a tapered face of the housing 1200 is brought into contact with the mounting face 103 of the mounting hole 101. At the same time, the sealing portion 1204 is pressed into close contact with the mounting face 103 so that it can prevent the high-pressure combustion gas to be produced in the combustion chamber 102 from leaking into the mounting hole 101.

When the housing 1200 is thus fastened, the housing 1200 is compressed between the sealing portion 1204 and the externally threaded portion 1203 so that this intermediate portion is elastically shrunken. Then, by the elastic force of the compressed portion of the housing 1200, the sealing portion 1204 and the mounting face 103 of the mounting hole 101 are elastically pressed to contact so that the gas-tightness can be more reliably kept.

On the other hand, the center pole 1300 (or the center pole body 1301), which is jointed through the connecting ring 1330 to the heater member 1100 held by the heater holding member 1210, is lifted to the root-end side relative to the housing 1200, that is, the center pole 1300 (or the center pole body 1301) is moved to the root-end side (as located on the upper side of the drawing) relative to the housing 1200. As a result, the center pole sleeve 1340 and its outward protrusion 1342 move to the root-end side so that the compressive preload applied to the first piezoelectric element 1400 further increases. On the other hand, the compressive preload applied to the second piezoelectric element 1500 decreases.

When this internal combustion engine 100 is started, a high combustion pressure is produced in the combustion chamber 102 by the explosive combustion of the fuel.

Then, the heater member 1100 and the housing leading-end portion 1201 of the glow plug 1000 are displaced to the axial root-end side by that combustion pressure. As a result, the portion of the housing 1200 between the externally threaded portion 1203 and the sealing portion 1204 is further compressed.

As has been described hereinbefore, the center pole 1300 is jointed mechanically rigidly to the heater member 1100 through the connecting ring 1330, and the heater member 1100 is held by the heater holding portion 1205 of the housing 1200. Therefore, the center pole 1300 is likewise displaced when the heater holding portion 1205 (or the housing leading-end portion 1201) is displaced.

At the housing root-end portion 1202, therefore, the center pole 1300 moves, as the combustion pressure rises, to the axial root-end side relative to the housing 1200, more specifically, to the externally threaded portion 1203 or the portion of the housing to be fixed in the internal combustion engine.

Figure 9:
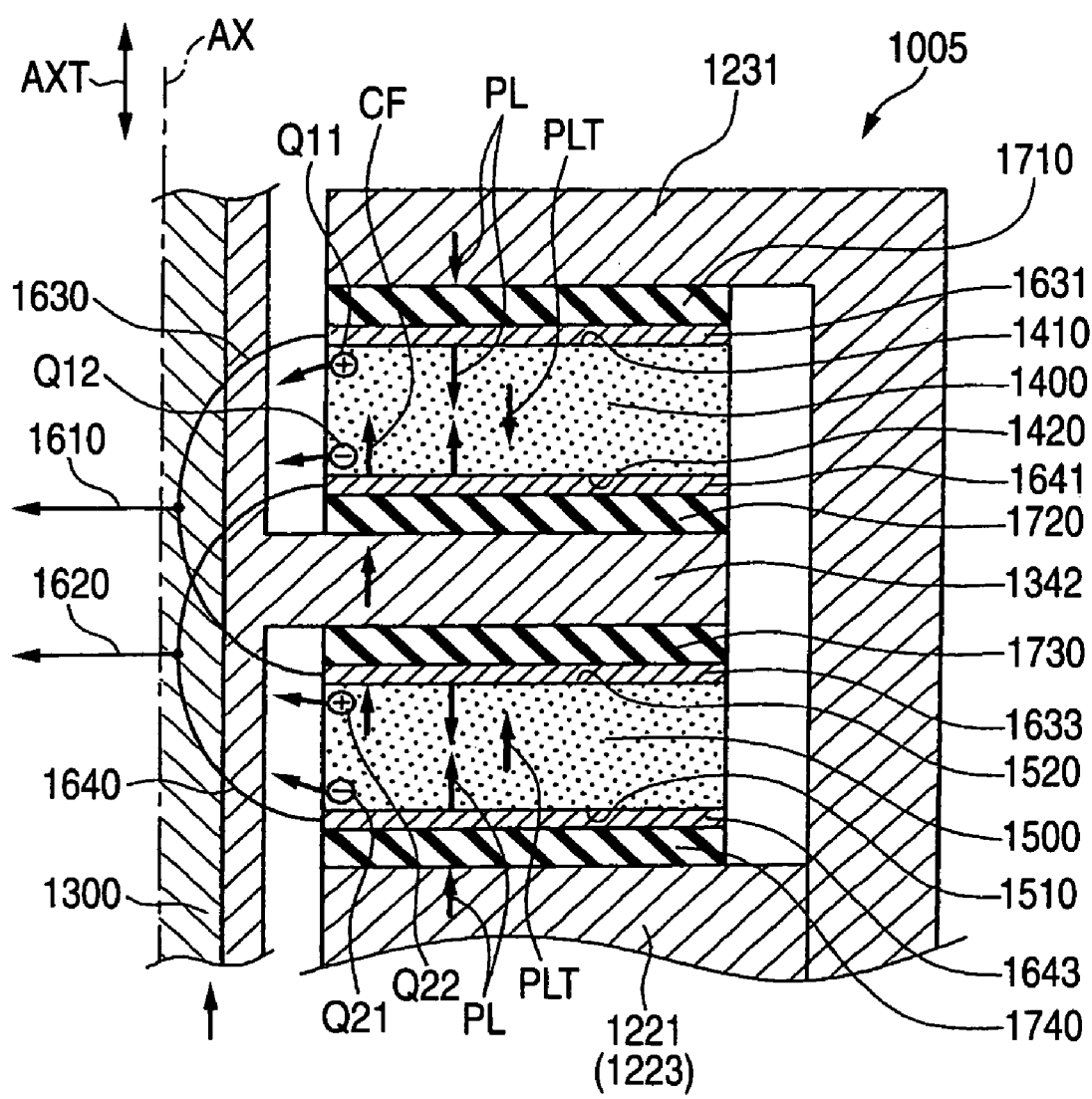
FIG. 9 is an explanatory view for explaining the relation between the displacement of the center pole and the charge to be produced in a combustion pressure sensor portion of the glow plug having the combustion pressure detecting function according to Embodiment 1.

FIG. 9 is an explanatory diagram for explaining the actions of the combustion pressure sensor 1005 by simplifying a portion of the longitudinal section of the combustion pressure sensor 1005.

In this combustion pressure sensor 1005, the first insulating spacer 1710, the 1-1 electrode portion 1631, the first piezoelectric element 1400, the 1-2 electrode portion 1641, the second insulating spacer 1720, the outward protrusion 1342, the third insulating spacer 1730, the 2-2 electrode portion 1633, the second piezoelectric element 1500, the 2-1 electrode portion 1643 and the insulating spacer 1740 are clamped in the recited order between the inward protrusion 1231 and the confronting portion 1221, as has been described hereinbefore. As a result, both the first piezoelectric element 1400 and the second piezoelectric element 1500 are pre-loaded by PL in the compressing direction. Here, the first piezoelectric element 1400 is so arranged that its polarizing direction PLT is directed to the leading-end side (or downward in FIG. 9) along the axis AX (or in parallel with the axial direction AXT). On the other hand, the second piezoelectric element 1500 is so arranged that its polarizing direction PLT is directed to the root-end side (or upward in FIG. 9) along the axis AX.

When the center pole body 1301 and the center pole sleeve 1340 of the center pole 1300 are displaced to the root-end side relative to the housing 1200 by the rise of the combustion pressure in the combustion chamber 102 of the internal combustion engine 100, the outward protrusion 1342 of the center pole sleeve 1340 is also displaced to the root-end side. In the first piezoelectric element 1400, therefore, a compressive stress CF due to the displacement of the outward protrusion 1342 is applied in addition to the preload PL thereby to increase the axial compressive load to be applied to the first piezoelectric element 1400. In the second piezoelectric element 1500, on the other hand, the axial compressive load to be applied to the second piezoelectric element 1500 is reduced to a value less than the preload PL by the displacement of the outward protrusion 1342.

Here are considered the charges which are built up on the respective faces (i.e., the 1-1 face 1410 and so on) of the first and second piezoelectric elements 1400 and 1500. The first piezoelectric element 1400 is so polarized that the plus charge is produced on the 1-1 face 1410 whereas the minus charge is produced on the 1-2 face 1420 as the compressive load increases in the axial direction of the first piezoelectric element 1400. In case, therefore, the combustion pressure rises so that the center pole 1300 is displaced to the root-end side thereby to increase the compressive load to be applied on the first piezoelectric element 1400, as has been described hereinbefore, the plus charge Q11 is produced on the 1-1 face 1410, and the minus charge Q12 is produced on the 1-2 face.

On the other hand, the second piezoelectric element 1500 is so polarized that the plus charge is produced on the 2-1 face 1510 whereas the minus charge is produced on the 2-2 face 1520 as the compressive load increases in the axial direction of the second piezoelectric element 1500. In the glow plug 1000 of this embodiment, however, the compressive load to be applied to the second piezoelectric element 1500 decreases as the combustion pressure rises so that the center pole is displaced to the root-end side, as has been described hereinbefore. Therefore, the charges in the opposite directions are produced, that is, a plus charge Q22 is produced on the 2-2 face 1520 whereas a minus charge Q21 is produced on the 2-1 face 1510.

The individual charges produced are derived to the individual electrodes of the first electrode member 1630 and the second electrode member 1640. In the first piezoelectric element 1400, more specifically, the plus charge Q11 produced on the 1-1 face 1410 is derived to the 1-1 electrode portion 1631, and the minus charge Q12 produced on the 1-2 face 1420 is derived to the 1-2 electrode portion 1641. In the second piezoelectric element 1500, too, the plus charge Q22 produced on the 2-2 face 1520 is derived to the 2-2 electrode portion 1633, and the minus charge Q21 produced on the 2-1 face 1510 is derived to the 2-1 electrode portion 1643.

Moreover, the plus charges Q11 and Q22, which are produced at the 1-1 electrode portion 1631 and the 2-2 electrode portion 1633 both forming part of the first electrode member 1630, are added and extracted to the outside by the lead wire 1610. Likewise, the minus charges Q12 and Q21, which are produced at the 1-2 electrode portion 1641 and the 2-1 electrode portion 1643 both forming part of the second electrode member 1640, are added and extracted to the outside by the lead wire 1620. As a result, this combustion pressure sensor 1005 can acquire an output (or charge) about two times as high as that of the case, in which one piezoelectric element is used.

Figure 10:
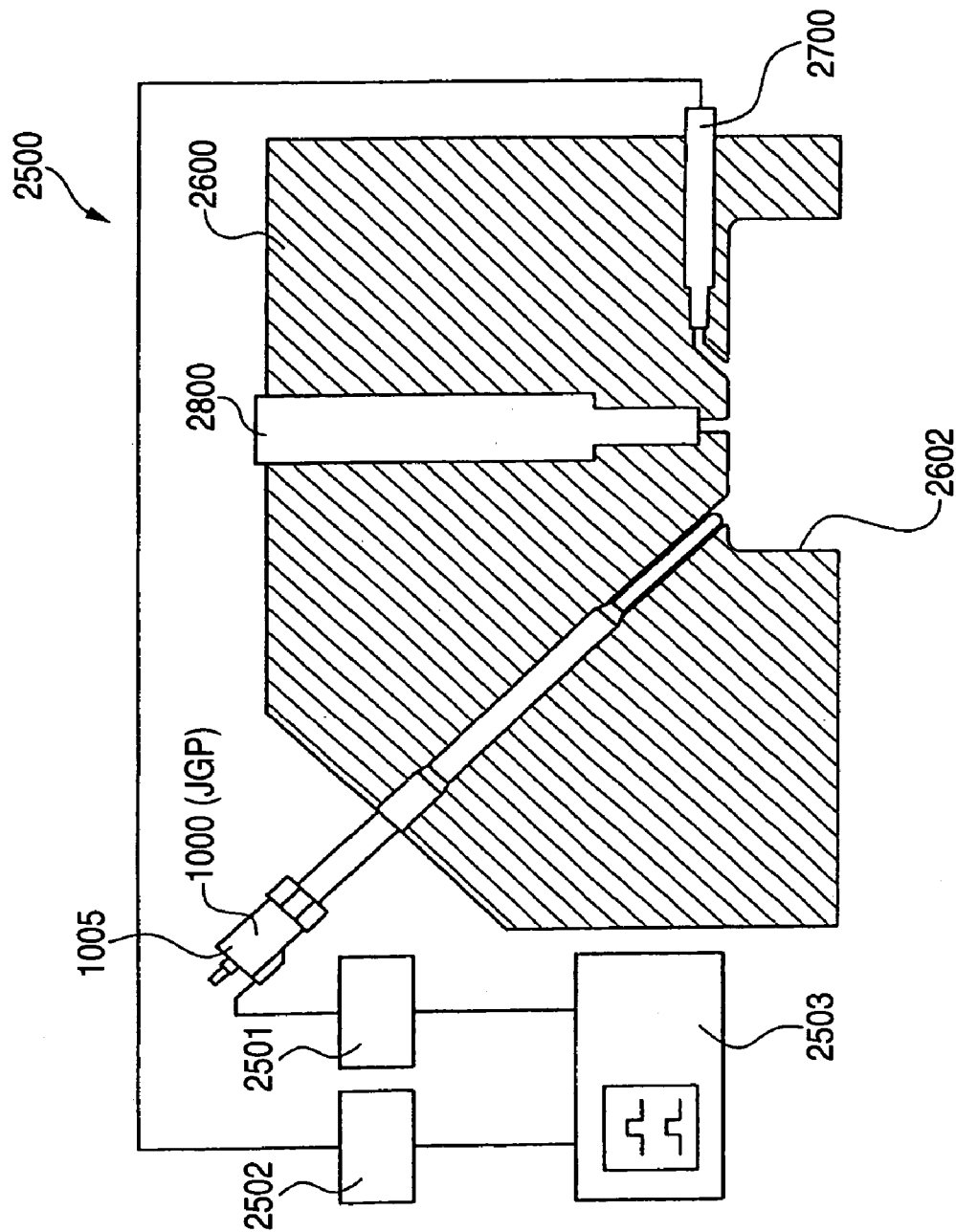
FIG. 10 is an explanatory view showing a system for measuring the sensor output of the glow plug having the combustion pressure detecting function by using an internal combustion engine.

In order to confirm the aforementioned effects, moreover, the actual output of the combustion pressure sensor 1005 of the glow plug 1000 was measured by means of a measuring system 2500 using an internal combustion engine 2600, as shown in FIG. 10. This measuring system 2500 uses the internal combustion engine 2600 of the type for injecting the fuel into a combustion chamber 2602 by using a fuel injector 2800. The combustion pressure of the internal combustion engine 2600 (or the combustion chamber 2602) is measured by using the glow plug 1000 having the combustion pressure sensor 1005 according to this embodiment and by using a glow plug JGP having a combustion pressure sensor using a single piezoelectric element of the prior art or Comparison 1.

Here, a reference pressure sensor 2700 (i.e., 6052A of KISTLER Company) was used to measure the level of the combustion pressure by making it common between this embodiment and Comparison 1.

Specifically, the output of the combustion pressure sensor 1005 (i.e., the first and second piezoelectric elements 1400 and 1500) of the glow plug 1000 and the output of the glow plug JGP according to Comparison 1 are connected with a charge amplifier 2501 (i.e., 5011 of KISTLER Company), and the output of the reference pressure sensor 2700 is connected with a charge amplifier 2502 (i.e., 5011 of KISTLER Company). Moreover, the outputs of the charge amplifiers 2501 and 2502 are connected with an oscilloscope 2503. In order to observe the relation to the crank angle of the internal combustion engine 2600, moreover, the output of the not-shown crank angle sensor of the internal combustion engine 2600 is also connected with the oscilloscope 2503.

In this state, the internal combustion engine 2600 was activated, and the crank angle sensor output was connected with the X-axis input of an oscilloscope 2503 whereas the output of the charge amplifier 2501 was connected with the Y-axis input so that the graphs plotting the relations between those outputs were obtained.

The measurement results using the measuring system 2500 are plotted in FIG. 11. The abscissa indicates the crank angle, and the ordinate indicates the sensor output. Of these, a graph 2900 plotted by a broken line plots a relation between the crank angle and the sensor output of the combustion pressure sensor of the glow plug JGP of the conventional type using one piezoelectric element. On the other hand, a graph 2901 plots a relation between the crank angle and the sensor output of the combustion pressure sensor 1005 of the glow plug 1000 according to this embodiment.

As easily understood from FIG. 11, the glow plug 1000 of the embodiment using the two or first and second piezoelectric elements 1400 and 1500 can acquire an output of about two times as high as that of the glow plug JGP using one piezoelectric element all over the crank angle.

When the glow plug 1000 according to this embodiment is mounted in the mounting hole 101 of the internal combustion engine 100 (as referred to FIGS. 3A and 3B), as has been described hereinbefore, the portion of the housing 1200 between the externally threaded portion 1203 and the sealing portion 1204 is slightly shrunken as the fastening operation proceeds. Then, the center pole 1300 is displaced to the root-end side relative to the housing 1200, as the combustion pressure rises. Then, the preload to be applied to the first piezoelectric element 1400 increases, but the preload to be applied to the second piezoelectric element 1500 decreases.

In the combustion pressure sensor of the type to be used by applying the preload in the compressive direction to the piezoelectric element, generally speaking, the sensitivity, i.e., the quantity of charge to be produced for the change in the compressive force changes when the magnitude of the preload changes. Specifically, the sensitivity drops for a low preload but rises for a high preload. This sensitivity change is estimated, as follows. The surfaces (or abutting faces) of the outward protrusion 1342 of the center pole sleeve 1340 are not in complete contact with each other as in the first and second piezoelectric elements 1400 and 1500, the first insulating spacer 1710 or the like. The sizes of the individual clearances are fluctuated by the magnitude of the compressive stress so that the magnitude of the compressive stress to be applied to the first piezoelectric element 1400 or the like varies.

In case, therefore, the glow plug 1000 of this embodiment is fastened, the first piezoelectric element 1400 has its sensitivity raised the higher as the fastening force, i.e., the fastening torque is the higher. On the other hand, the second piezoelectric element 1500 has its sensitivity lowered. In case, therefore, the aforementioned glow plug JGP of the prior art, the first piezoelectric element 1400 or the second piezoelectric element 1500 is exclusively used, its sensitivity is varied according to the magnitude of the fastening force (or the fastening torque) at the time when the glow plug 1000 is mounted in the mounting hole 101. Under the same combustion pressure, therefore, there arises a drawback that the sensor output (or the pressure of the piezoelectric element) is dispersed. There before the fastening torque has be strictly managed so as to suppress the dispersion in the sensitivity of the combustion pressure sensor 1005 of the glow plug 1000 for the individual internal combustion engine.

In the glow plug 1000 according to this embodiment, on the other hand, for the first piezoelectric element 1400 having its sensitivity raised with the increase in the fastening force (or the fastening torque) and for the second piezoelectric element 1500 having its sensitivity lowered, the 1-1 face 1410 and the 2-2 face 1520 are connected, and the 1-2 face 1420 and the 2-1 face 1510 are connected, so that the charges to be produced on the individual faces are summed up. In case, therefore, the fastening force (or the fastening torque) is high, the first piezoelectric element 1400 has its sensitivity raised to produce more charge under the common combustion pressure. However, the second piezoelectric element 1500 has its sensitivity lowered to produce less charge under the common combustion pressure. If, therefore, these charges produced are summed up, it is thought that the quantity of charge to be produced under the common combustion pressure is not seriously different from that of the case, in which the fastening force (or the fastening torque) is low. In the glow plug 1000 according to this embodiment, more specifically, the individual piezoelectric elements can have their sensitivity variations canceled each other to extract the charges (or the outputs). Therefore, the influences of the magnitude of the fastening torque at the screwing time upon the sensitivities of the piezoelectric elements can be lightened to manage the fastening torque easily. Thus, it is possible to provide a glow plug with a combustion pressure detecting function, which can detect the variation in the combustion pressure properly over a wide range of the fastening torque.

Figure 12A:
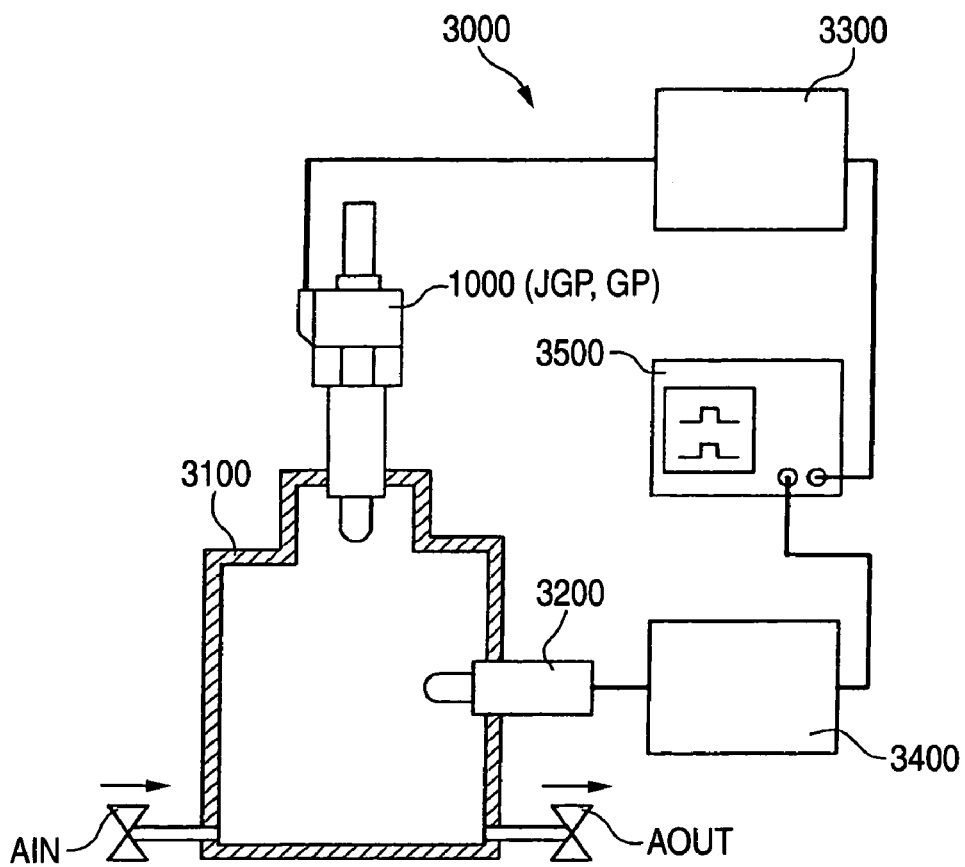

In order to confirm the aforementioned effects, the actual output of the glow plug shown in FIG. 12A was measured by means of a measuring system 3000 using an air chamber. This measuring system 300 is equipped with an air chamber 3100 for housing the high-pressure air gastight, a solenoid valve AIN for connecting the air chamber 3100 to the not-shown high-pressure air producing device, and a solenoid valve AOUT for connecting the air chamber 3100 to the atmosphere. The solenoid valve AIN and the solenoid valve AOUT are air valves to be opened/closed by the well-known solenoid. The solenoid valve AIN and the solenoid valve AOUT are so configured that they are closed, when fed with no voltage (at a low potential), to block the air vent but opened, when fed with a voltage (at a high potential), to open the air vent.

Moreover, either the glow plug 1000 or the glow plug JGP using one piezoelectric element according to Comparison 1, and a reference pressure sensor 3200 (i.e., 6052A of KISTLER Company) are individually mounted in the air chamber 3100; Moreover, the output of the glow plug 1000 or JGP is connected with a charge amplifier 3300 (i.e., 5011 of KISTLER Company), and the output of the reference pressure sensor 3200 is connected with a charge amplifier 3400 (i.e., 5011 of KISTLER Company). Moreover, the outputs of the charge amplifier 3300 and the charge amplifier 3400 are individually connected with the oscilloscope 3500. Still moreover, the reference pressure sensor 3200 is used, like the reference pressure sensor 2700 in the aforementioned measuring system 2500, for measuring the glow plug 1000 and the glow plug JGP under the common condition (e.g., with a common pressure change).

Figure 12B:
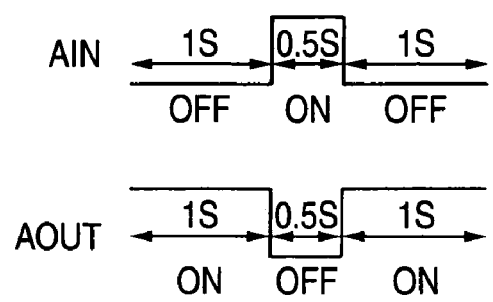

The measurements were carried out by mounting the glow plug 1000 of this embodiment and the glow plug JGP of Comparison 1 in the air chamber 3100 by a predetermined fastening torque. The solenoid valve AIN and the solenoid valve AOUT connected to the air chamber 3100 were operated in the sequences shown in FIG. 12B so that the inside of the air chamber 3100 repeated the state of the high pressure and the state of the atmospheric pressure. In these states, the output waveforms were acquired by inputting the output of the charge amplifier 3300 to the Y-axis input for the time axis of the X-axis of the oscilloscope 3500. Four fastening torques were measured by using the differences between the lower limits and the upper limits of those output waveforms as the sensor outputs of the individual glow plugs. For comparisons, moreover, measurements were made on a glow plug GP2 (i.e., Comparison 2) in place of the glow plug 1000 according to this embodiment. The glow plug GP2 had a configuration like that of the glow plug 1000, the first connecting portion 1632 of the first electrode member 1630 and the second connecting portion 1642 of the second electrode member 1640 were cut so that the individual outputs of the first piezoelectric element 1400 and the second piezoelectric element 1500 were extracted.

The results are plotted in FIG. 13. The abscissa indicates the fastening torque, and the ordinate indicates the sensor output. In FIG. 13, a graph 4001 plots the result of the glow plug JGP of the conventional type using one piezoelectric element, and a graph 4002 plots the result of the glow plug 1000 according to this embodiment. Moreover, a graph 4003 plots the result of the output generated at the first piezoelectric element 1400 of the glow plug GP2, and a graph 4004 plots the result of the output generated at the second piezoelectric element 1500 of the same glow plug GP2.

As could be easily understood with reference to FIG. 13, the graph 4001 implies that the glow plug JGP using one piezoelectric element had a small sensor output (or a low sensitivity) for a low fastening torque but a large sensor output (or a high sensitivity) for a high fastening torque. It could also be understood that the reduction in the sensitivity is serious in the case of the low fastening torque.

In the glow plug 1000 according to this embodiment, on the contrary, the magnitude of the sensor output is not only about two times as high as that of the graph 4001 but also substantially constant irrespective of the magnitude of the fastening torque value. In short, it is found that the sensitivity of the sensor output is hardly varied even if the magnitude of the fastening torque is varied. Here, the graph 4003 corresponding to the output of the first piezoelectric element 1400 relating to the glow plug GP2 exhibits variations substantially similar to those of the glow plug JGP of Comparison 1. On the contrary, the graph 4004 corresponding to the output of the second piezoelectric element 1500 exhibits the lower sensor output (or the lower sensor sensitivity) for the higher fastening torque. This is because the second piezoelectric element 1500 is configured to have the less preload for the higher fastening torque of the housing 1200, as has been described hereinbefore. Moreover, the sum of the graphs 4003 and 4004 is substantially equal to the graph 4002. It is, therefore, found that the variations of the sensor outputs due to the magnitude of the fastening torque are related to cancel each other.

Thus, it has been confirmed, as apparent from FIG. 13, that the glow plug 1000 of this embodiment has less influence of the magnitude of the fastening torque upon the sensor sensitivity than that of the glow plug JGP using on piezoelectric element.

Generally, the piezoelectric element has an electrically focusing effect to produce electric charge with its own temperature change even in the state where the stress to be applied to itself is not varied. In the piezoelectric element, more specifically, the face for producing the plus charge for a large compressive stress produces the plus charge even if the temperature rises. As the temperature of the piezoelectric element changes, the sensor output is drifted by the charge produced by the focusing effect with a resultant defect that the sensor output, cannot be properly measured.

Figure 14:
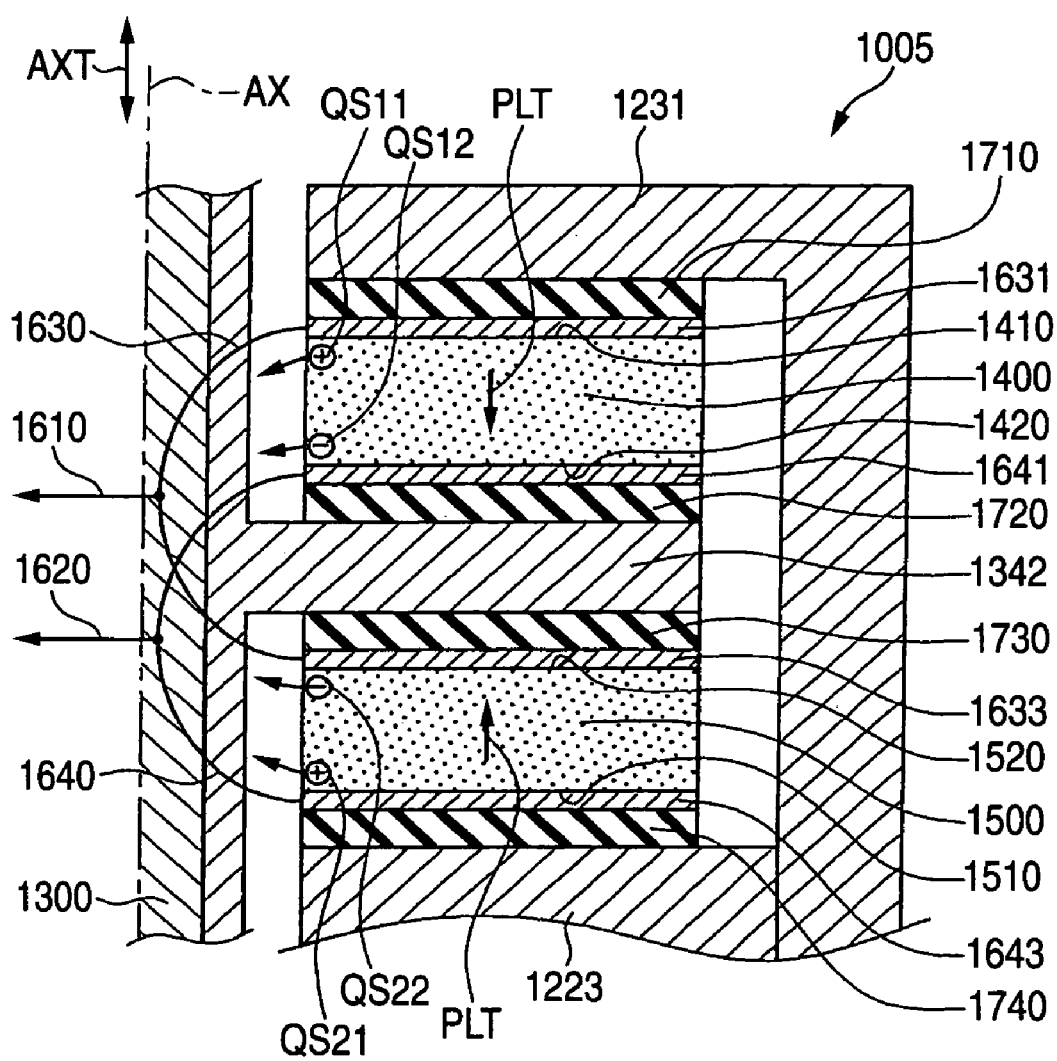
FIG. 14 is an explanatory view for explaining the combustion pressure sensor of the glow plug having the combustion pressure detecting function according to Embodiment 1 for an electrically focusing effect.

In case the temperature of the glow plug 1000 according to this embodiment rises, for example, the polarization direction PLT of the first piezoelectric element 1400 and the second piezoelectric element 1500 is shown in FIG. 14. As a result, a plus charge QS11 and a plus charge QS21 are produced on the 1-1 face 1410 of the first piezoelectric element 1400 and on the 2-1 face 1510 of the second piezoelectric element 1500. On the other hand, a minus charge QS12 and a minus charge QS22 are produced on the 1-2 face 1420 of the first piezoelectric element 1400 and on the 2-2 face 1520 of the second piezoelectric element 1500.

In the first piezoelectric element 1400 and the second piezoelectric element 1500 of the glow plug 1000 according to this embodiment, however, the 1-1 face 1410 and the 2-2 face 1520 are connected by the first electrode member 1630, and the 1-2 face 1420 and the 2-1 face 1510 are connected by the second electrode member 1640. Therefore, the plus charge QS11 and the minus charge QS22 cancel each other in the first electrode member 1630, and the minus charge QS12 and the plus charge QS21 cancel each other in the second electrode member 1640.

Especially in the glow plug 1000 according to this embodiment, the first piezoelectric element 1400 and the second piezoelectric element 1500 have shapes and characteristics identical to each other. Therefore, the quantities of the individual charges produced by the electrically connecting effect have substantially equal absolute values. As a result, the plus charge QS11 and the minus charge QS22 in the first electrode member 1630 have reversed polarities and substantially equal quantities so that they can just cancel each other. Likewise, the minus charge QS12 and the plus charge QS21 in the second electrode member 1640 can also just cancel each other.

In the glow plug 1000 according to this embodiment, therefore, the outputs from the first piezoelectric element 1400 and the second piezoelectric element 1500 can sufficiently suppress the influences of the charge productions by the electrically focusing effect.

In order to confirm the aforementioned effects, the aforementioned glow plugs 1000, JGP and GP2 were individually dipped in hot oil, and measurements were made on the temperature to rise with the time and on the quantities of charge to be produced by the electrically focusing effect. Here, the temperature was separately measured by the not-shown thermocouple, which was arranged in contact with the piezoelectric elements of the individual glow plugs.

Figure 15A:
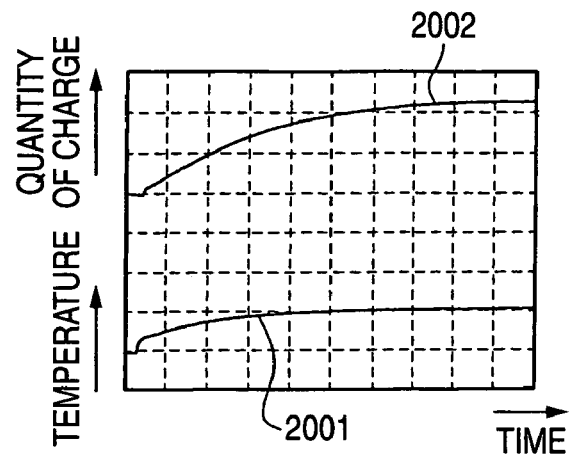
Figure 15B:
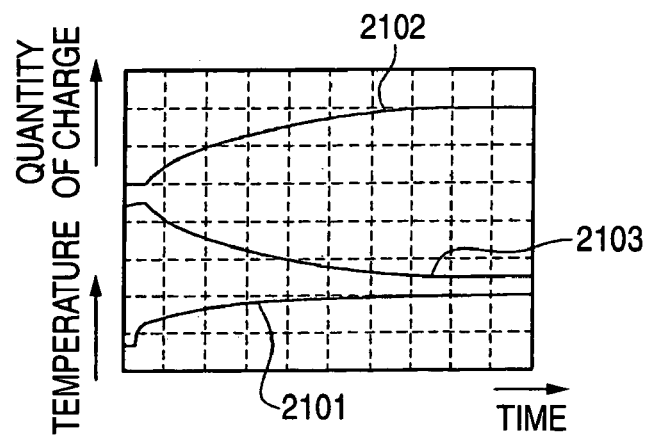
Figure 15C:
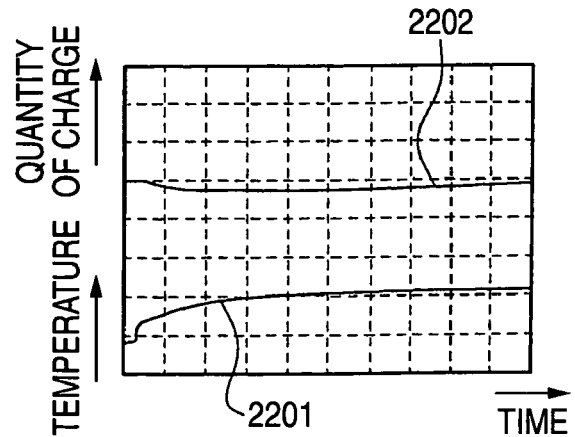

FIGS. 15A, 15B and 15C present graphs plotting the procedures of changes in the quantities of charge produced from the piezoelectric elements by the electrically focusing effect and in the temperatures of the piezoelectric elements for the individual glow plugs 1000, JGP and GP2. Of these, graphs 2001 and 2002 of FIG. 15A plot the time procedure of the temperature change of the piezoelectric element in the glow plug JGP (of Comparison 1) of the conventional type using that one piezoelectric element and the time procedure of the change in the quantity of produced charge. It can be understood from FIG. 15A that the charge is produced as the temperature of the piezoelectric element rises.

On the other hand, a graph 2101 and graphs 2102 and 2103 of FIG. 15B relate to the glow plug GP2 according to Comparison 2. Of these: the graph 2101 plots the time procedure of the temperature change of the first piezoelectric element 1400; the graph 2102 plots the time procedure of the quantity of charge produced by the first piezoelectric element 1400; and the graph 2103 plots the time procedure of the quantity of charge produced by the second piezoelectric element 1500. Here, the graph 2102 plots the charge produced in the first piezoelectric element 1400, with reference to the 1-2 face. On the other hand, the graph 2103 plots the charge produced in the second piezoelectric element 1500, with reference to the 2-2 face.

Therefore, it is understood by contrasting those graphs 2102 and 2103 that both the first piezoelectric element 1400 and the second piezoelectric element 1500 produce the charges by the electrically focusing effect, and that the charges produced by the first and second piezoelectric elements 1400 and 1500 have reversed polarities with common reference to the 1-2 face and the 2-2 face.

Moreover, a graph 2201 and a graph 2202 of FIG. 15C plot the time procedure of the temperature change of the first piezoelectric element 1400 in the glow plug 100 of this embodiment and the quantity of the charge (i.e., the sum of the charges to be produced by the first and second piezoelectric elements 1400 and 1500) to be outputted from the glow plug 1000. As could be easily understood from the graph 2202, the combustion pressure sensor 1005 of the glow plug 1000 of this embodiment produces little charge by the electrically focusing effect even if the temperatures of the first and second piezoelectric elements 1400 and 1500 changes. This is because the first and second piezoelectric elements 1400 and 1500 were so connected by the first and second electrode members 1630 and 1640 as to have their polarizing directions reversed, so that the charges (corresponding to the graphs 2102 and 2103 of FIG. 15B) produced by the electrically focusing effect could cancel each other.

Thus, it is understood that the glow plug 1000 of this embodiment can measure the combustion pressure properly even with the temperature change while suppressing the drive of the output due to the electrically focusing effect.

In the glow plug 1000 according to Embodiment 1, moreover, both the charges produced on the two faces of the first and second piezoelectric elements 1400 and 1500 are derived to the outside by using the lead wires 1610 and 1620 (or the cable 1650) while both the two piezoelectric elements being insulated from the housing 1200 and the center pole 1300. Thus, even if the earth level of the housing 1200 is fluctuated by feeding a large current to the center pole 1300, the outputs of the piezoelectric elements 1400 and 1500, that is, the output of the combustion pressure sensor 1005 can be stably obtained independently of the fluctuations.

By using the two lead wires 1610 and 1620, however, the charge (or the output) has to be derived to the outside so that the combustion pressure sensor 1005 has rather complicated configuration and manufacture.

Here is considered the case, in which the pressure in a space H in the glow plug 1000 between the inner side face 1207 of the housing 1200 and the outer side face 1303 of the center pole 1300 is varied. This is because the combustion gas, as produced by the explosive combustion of the fuel, under a high pressure in the combustion chamber of the internal combustion engine 100 may invade into the space H through the clearance between the heater member 1100 and the heater holding member 1210 of the housing 1200.

When the pressure in the space H rises in the absence of the O-ring 1700, the center pole sleeve 1340 is raised to the root-end side (as located on the upper side in FIG. 2) by the pressure of the combustion gas. As a result, the compressive stress to be applied to the first and second piezoelectric elements 1400 and 1500 is varied to vary the outputs of the elements 1400 and 1500. In short, the detection of the change in the combustion pressure may be influenced by the invasion of the high-pressure combustion gas into the space H. Especially in the glow plug 1000 according to this embodiment, the combustion pressure sensor 1005 is sealed on its root-end side with the resin 1040. Therefore, the combustion gas has no way of escape to flow to the root-end side and may receive the aforementioned influences.

In the glow plug 1000 of this embodiment, however, the space H and the space J are partitioned gastight by the O-ring 1700, as has been described hereinbefore. In this glow plug 1000, however, the high-pressure combustion gas is prevented by the O-ring 1700, even if having invaded into the space H, from further invading into the space J. As a result, the combustion gas does not reach the combustion pressure sensor 1005 (i.e., the first and second piezoelectric elements 1400 and 1500) so that the combustion pressure can be properly detected without any influence.

Here will be described a method for manufacturing the glow plug 1000 according to Embodiment 1. Of the manufacture of the glow plug 1000, the manufacture of the heater member 1100 may accord to the well-known method, and its description is omitted.

Of the heater member 1100, the root-end side is press-fitted and fixed in the heater holding member 1210, and the heater root-end portion 1102 is jointed through the connecting ring 1330 to the center pole leading-end portion 1320 of the center pole 1300. Next, the heater holding member 1210 and the housing body member 1220 are fixed. With the center pole body 1301 being thus arranged in the housing 1200, the glow plug 1000 of Embodiment 1 is manufactured, as follows.

Of the manufacture of the combustion pressure sensor 1005 shown in FIG. 4B, the assembly of the individual members with the center pole sleeve 1340 is described at first. The first cylindrical portion 1341 and the second cylindrical portion 1343 of the center pole sleeve 1340 are sheathed in advance with the insulating tube 1352 and the insulating tube 1351, respectively (as referred to FIG. 2). The members are assembled on the two axial sides across the outward protrusion 1342 of the center pole sleeve 1340. Specifically, the second insulating spacer 1720, the 1-2 electrode portion 1641 and the first piezoelectric element 1400 are inserted in the recited order into the first cylindrical portion 1341 of the center pole sleeve 1340. Here, the first piezoelectric element 1400 is arranged to have its 1-1 face 1410 directed toward the outward protrusion 1342. Moreover, the third insulating spacer 1730, the 2-2 electrode portion 1633 and the second piezoelectric element 1500 are inserted in the recited order into the second cylindrical portion 1343 of the center pole sleeve 1340. The second piezoelectric element 1500 is arranged to have its 2-2 face 1520 directed toward the outward protrusion 1342. Next, the 1-1 electrode portion 1631 or the other end of the 2-2 electrode portion 1633 is inserted into the first cylindrical portion 1341, and the 2-1 electrode portion 1643 or the other end of the 1-2 electrode portion 1641 is inserted into the second cylindrical portion 1343. Finally, the assembly of the center pole sleeve 1340 of the individual members is completed by inserting the first-insulating spacer 1710 into the first cylindrical portion 1341 and the fourth insulating spacer 1740 into the second cylindrical portion 1343.

Next, the center pole body 1301 having its root-end portion protruded from the housing body root-end portion 1223 is inserted from the leading-end side into the center pole sleeve 1340 so that the fourth insulating spacer 1740 comes into abutment against the housing body root-end portion 1223. With the first cylindrical portion 1341 of the center pole sleeve 1340 partially protruding to the root-end side, moreover, the sensor cap 1230 is pushed by a predetermined pushing force from the root-end side to the leading-end side of the axial direction. With this pushing force being kept, the annular portion 1233 of the sensor cap 1230 and the outer circumference of the root-end side of the housing body root-end portion 1223 are laser-welded throughout the circumference by using a YAG laser thereby to form the root-end side first welded portion 1225. In this combustion pressure sensor 1005, therefore, the compressive load is always applied in the axial direction to the first piezoelectric element 1400 and the second piezoelectric element 1500 (as referred to FIG. 2).

After this, the boundary portion between the center pole sleeve 1340 and the center pole body 1301 are arc-welded throughout the circumference. At the portion L2, therefore, the center pole sleeve 1340 is fixed to and integrated with the center pole body 1301.

Next, the lead wires 1610 and 1620 are spot-welded to the first and second connecting portions 1632 and 1642 of the first electrode member 1630 and the second electrode member 1640, respectively, as shown in FIG. 4B. Moreover, the enclosing member 1010 is put from the root-end side and is welded throughout the circumference to the housing body member 1220 by a laser-welding thereby to form a root-end side second welded portion 1226 (as referred to FIG. 2). After this, the root-end side of the sensor cap 1230 and the inside of the enclosing member 1010 are filled with a resin, and this resin is set to form the sealing resin 1040. Finally, the externally threaded portion 1203 of the center pole body 1301 is screwed into the internally threaded portion 1311 of the center pole root-end portion 1310, and the center pole body 1301 and the center pole root-end portion 1310 are caulked and jointed to complete the glow plug 1000.

(Modification 1)

Next, a first modification of Embodiment 1 is described with reference to FIG. 16. The foregoing Embodiment 1 has used the heater member 1100 having the heater heating portion 1110 made of a non-metallic heating element, i.e., the so-called ceramic heater. On the contrary, a glow plug 5000 of Modification 1 is different in that it uses a sheath member 5100 having a heater member 5101 made of a metallic heating element. Therefore, the description is made only on the different portions, but the description on similar portions is omitted.

Figure 16:
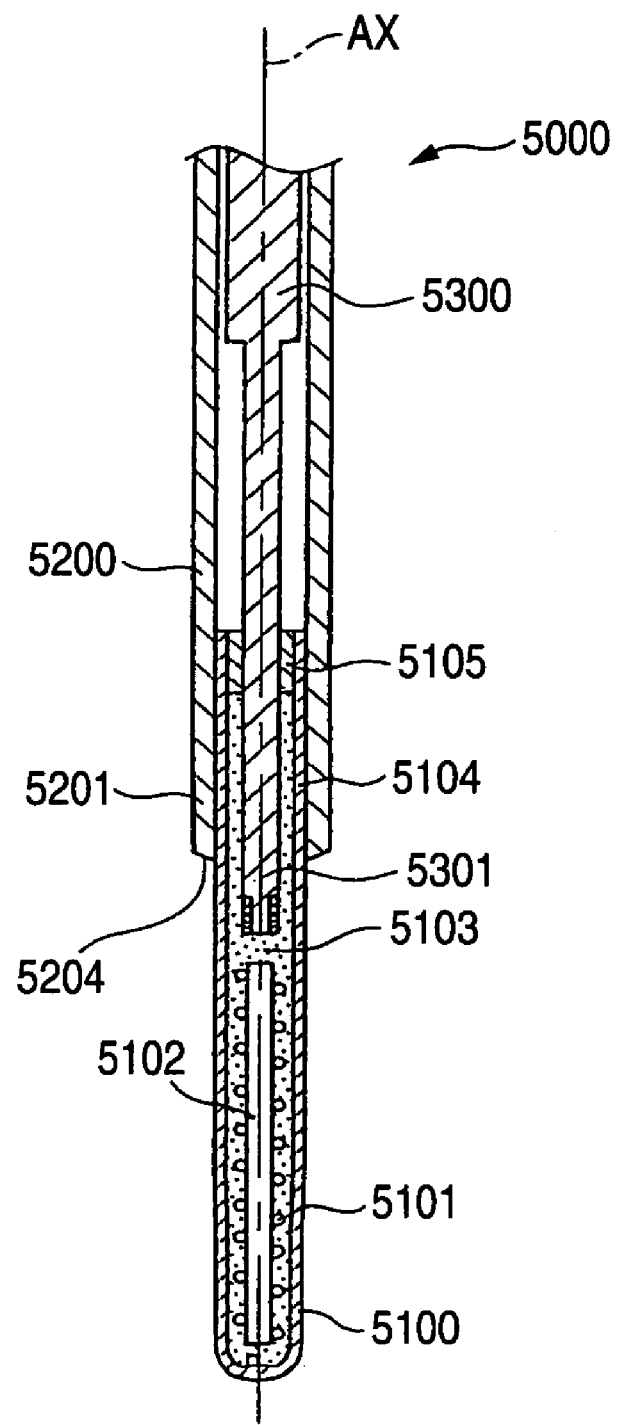
FIG. 16 is an enlarged longitudinal section showing the vicinity of the leading end of a glow plug having the combustion pressure detecting function according to Modification 1.

FIG. 16 is an enlarged section of a leading-end portion of the glow plug 5000. This glow plug 5000 is equipped with a cylindrical housing 5200 extending in the axial direction; a center pole 5300 held in the housing 5200; and the sheath member 5100 holding the coil-shaped heater member 5101 therein and having its leading end (or the lower end in FIG. 16) closed in a substantially semispherical shape.

The heater member 5101 is a metal wire made of an iron-chromium alloy or a cobalt-nickel alloy and formed by winding it around an insulated rod 5102, as shown in FIG. 16. This heater member 5101 has its one end welded on the leading-end side (as located on the lower side of the drawing) to the sheath member 5100. The other end is wound on a center pole leading-end portion 5301 of the center pole 5300 so that it is conducted to the center pole 5300.

By applying a voltage between the sheath member 5100 and the housing 5200 fixing the sheath member 5100, and the center pole 5300, therefore, the heater member 5101 is fed with an electric current so that it is heated. The heater member 5101 and the center pole leading-end portion 5301 of the center pole 5300 are arranged together with insulating filler powder 5103 in the sheath member 5100. The insulating filler powder 5103 densely fills up so that the heater member 5101 and the center pole 5300, and the sheath member 5100 are jointed mechanically integrally. In order to prevent the leakage of the insulating filler powder 5103, a rubber packing 5105 is sandwiched on the root-end side (as located on the upper side of the drawing) of the sheath member 5100 between the sheath member 5100 and the center pole 5300.

The sheath member 5100 is made of stainless steel and is held to have its leading end protruding from the housing leading-end portion 5201 to the leading-end side such that its outer circumference and the inner circumference of a housing leading-end portion 5201 of the housing 5200 make close contact in a sheath root-end portion 5104. By press-fitting the sheath member 5100 in the housing leading-end portion 5201, more specifically, the sheath member 5100 is held gastight in the housing leading-end portion 5201. Even when this glow plug 5000 is mounted in the internal combustion engine, the high-pressure combustion gas does not invade into the housing 5200.

The vicinity of the axial leading end of the housing 5200 is formed into a sealing portion 5204 having a converging taper face. When this glow plug 5000 is mounted in the internal combustion engine 100, the sealing portion 5204 comes, like the sealing portion 1204 in the glow plug 1000 of Embodiment 1, into abutment against the mounting face 103 (as referred to FIGS. 3A and 3B) of the mounting hole 101 thereby to keep the gas-tightness between the housing 5200 and the mounting hole 101.

In case the sheath member 5100 receives a force directed to the axial root-end side as the combustion pressure is raised by the run of the internal combustion engine, the portion of the housing 5200 from the externally threaded portion (as referred to FIG. 1A) to the sealing portion 5204 is slightly shrunken, and the sheath member 5100, the heater member 5101 and the center pole 5300 are slightly displaced toward the axial root-end side. When the center pole 5300 is thus displaced to the axial root-end side relative to the housing 5200, as in the glow plug 1000 of Embodiment 1, the combustion pressure sensor 1005 (i.e., the first and second piezoelectric elements 1400 and 1500) produces the charge in accordance with the displacement of the center pole 5300. Thus, the glow plug 5000 can also detect the variation in the combustion pressure of the internal combustion engine.

This glow plug 5000 also uses the combustion pressure sensor 1005, which is disposed on the root-end side of the housing 5200 with a configuration like that of Embodiment 1. Like Embodiment 1, therefore, it is effectively possible to make the output about two times as high as that of the case using the single element, to suppress the variation in the sensitivity of the combustion pressure sensor by the fastening torque of the housing 5200, and to suppress the quantity of charge by the electrically focusing effect accompanying the temperature change thereby to suppress the drift of the output due to the temperature change.

(Modification 2)

A second modification of Embodiment 1 is described with reference to FIG. 17. In the foregoing Embodiment 1, the combustion pressure sensor 1005 has used the ring-shaped first and second piezoelectric elements 1400 and 1500, which are polarized in the polarizing direction PLT parallel to the axial direction AXT along the axis AX.

On the other hand, a glow plug 2000 of Modification 2 is substantially similar except that its combustion pressure sensor 2005 uses first and second piezoelectric elements 2400 and 2500, which are polarized in a radial direction perpendicular to the axis AX. Therefore, the description is made only on the different portions, but the description on similar portions is omitted.

Figure 17:
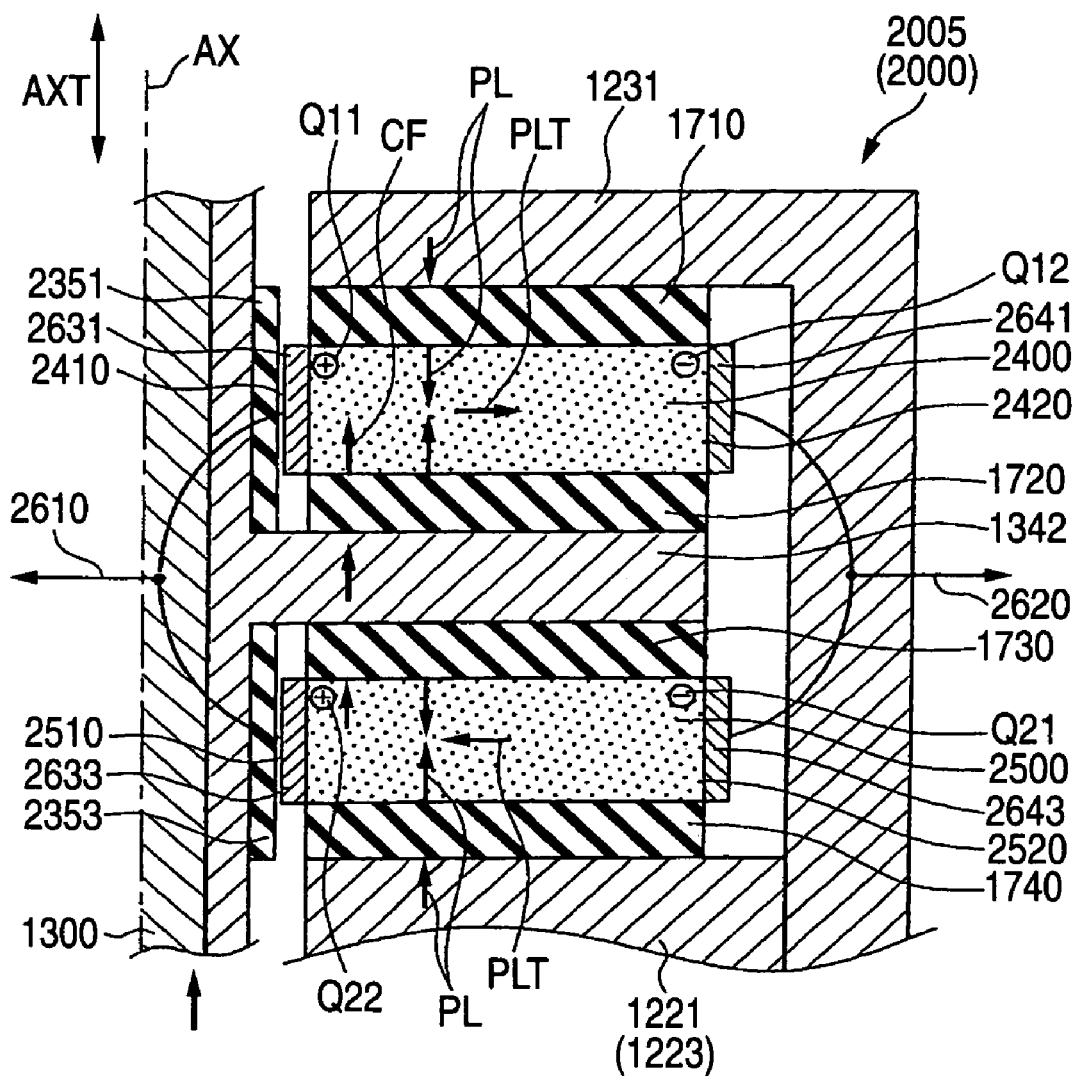
FIG. 17 is an explanatory view showing the arrangements, the polarizing directions and the charge extractions of a first piezoelectric element and a second piezoelectric element of a glow plug having the combustion pressure detecting function according to Modification 2.

FIG. 17 is an explanatory view for explaining the actions of the combustion pressure sensor 2005 of the glow plug 2000 while simplifying the longitudinal section of the combustion pressure sensor 2005 partially.

In this combustion pressure sensor 2005, the first insulating spacer 1710, the first piezoelectric element 2400, the second insulating spacer 1720, the outward protrusion 1342, the third insulating spacer 1730, the second piezoelectric element 2500 and the insulating spacer 1740 are clamped in the recited order between the inward protrusion 1231 and the confronting portion 1221. As a result, the compressive preload PL in the axial direction AXT is applied to the first piezoelectric element 2400 and the second piezoelectric element 2500.

Here, the first piezoelectric element 2400 is so polarized that its polarizing direction PLT is directed radially outward (i.e., rightward of FIG. 17) perpendicularly of the axis AX. On the other hand, the second piezoelectric element 2500 is so polarized that its polarizing direction PLT is directed radially inward (i.e., leftward of FIG. 17) perpendicularly of the axis AX. With these polarizations, moreover, when the compressive load in the axial direction is applied to the first piezoelectric element 2400, a plus charge is produced in a first inner circumference electrode 2631 formed on its first inner circumference 2410, and a negative charge is produced in a first outer circumference electrode 2641 formed on a first outer circumference 2420. When the compressive load in the axial direction is applied to the second piezoelectric element 2500, on the other hand, a plus charge is produced in a second inner circumference electrode 2633 formed on its inner circumference 2510, and a negative charge is produced in a second outer circumference electrode 2643 formed on a second outer circumference 2520.

Between the first and second inner circumference electrodes 2631 and 2633 and the center pole 1300 (or the center pole sleeve 1340), there are interposed the insulating tubes 2351 and 2353, which are made of an insulating resin thereby to insulate them.

When the center pole body 1301 and the center pole sleeve 1340 of the center pole 1300 are displaced toward the root-end side relative to the housing 1200 by the rise of the combustion pressure in the combustion chamber 102 of the internal combustion engine 100, the outward protrusion 1342 of the center pole sleeve 1340 is also displaced toward the root-end side. Therefore, not only the preload PL already applied and the compressive stress CF due to the displacement of the outward protrusion 1342 are further applied to the first piezoelectric element 2400 so that the axial compressive load to be applied to the first piezoelectric element 2400 increases. In the second piezoelectric element 2500, on the contrary, the axial compressive load to be applied to the second piezoelectric element 2500 is made lower than the preload PL by the displacement of the outward protrusion 1342.

Here are considered the charges, which are produced on the individual faces (i.e., the first inner circumference 2410 and so on) of the first and second piezoelectric elements 2400 and 2500. In case the combustion pressure rises to displace the center pole 1300 toward the root-end side so that the compressive load to be applied to the first piezoelectric element 2400 increases, the plus charge Q11 is produced on the first inner circumference 2410 (or the first inner circumference electrode 2631) of the first piezoelectric element 2400, and the minus charge Q12 is produced on the first outer circumference 2420 (or the first outer circumference electrode 2641).

In the second piezoelectric element 2500, on the other hand, when the combustion pressure rises so that the center pole 1300 is displaced to the root-end side, the compressive load to be applied to the second piezoelectric element 2500 decreases. As a result, the plus charge Q22 is produced on the second inner circumference (or the second inner circumference electrode 2633), and the minus charge Q21 is produced on the second outer circumference (or the second outer circumference electrode 2643).

The plus charges Q11 and Q22 thus produced are summed and extracted to the outside through a lead wire 2610, and minus charges Q12 and Q21 are summed and extracted to the outside through a lead wire 2620. Therefore, this combustion pressure sensor 2005 can also produce an output (or a charge) about two times as high as that of the case, in which one piezoelectric element is used.

In case, on the other hand, the charges are produced in the first and second piezoelectric elements 2400 and 2500 by the electrically focusing effect accompanying the temperature change, the produced charges cancel each other as in Embodiment 1, because the piezoelectric elements used have the reversed polarizing directions, so that the influence by the temperature change can be reduced.

In the glow plug 2000 of Embodiment 2, too, the influences on the sensor sensitivity due to the magnitude of the fastening torque at the mounting time can be lightened as in Embodiment 1.

In Modification 2, unlike the aforementioned Embodiment, the first and second electrode members 1630 and 1640 (or the 1-1 electrode portion 1631 or the like) are not interposed between the first and second piezoelectric elements 2400 and 2500 and the individual insulating spacers 1710, 1720, 1730 and 1740. This absence raises an advantage that it is possible to prevent the reduction of rigidity, which might otherwise be caused by the presence of those electrode members or the presence of their boundary.

[Embodiment 2]

Next, a second example of the invention is described with reference to FIG. 18 to FIG. 20. In the aforementioned glow plug 1000 according to Embodiment 1, the charges produced on the two faces of the first and second piezoelectric elements 1400 and 1500 are derived to the outside through the lead wires 1610 and 1620 while being insulated from the housing 1200 or the like. Thus, the output of the combustion pressure sensor 1005 can be stably obtained irrespective of the fluctuation in the earth level of the housing 1200.

On the other hand, a glow plug 6000 according to Embodiment 2 is identical in that it uses the first and second piezoelectric elements 1400 and 1500, and in that the combustion pressure sensor is so configured that the compressive load increases in the first piezoelectric element 1400 when the center pole 1300 is displaced to the root-end side whereas the compressive load decreases in the second piezoelectric element 1500.

However, Embodiment 2 is different in that the charges to be produced on the two faces (i.e., the 1-2 face and the 2-1 face) of one of the first and second piezoelectric elements 1400 and 1500 are derived to the outside through the lead wires whereas the remaining two faces (i.e., the 1-1 face and the 2-2 face) are made conductive to the housing and lowered to the earth level. Therefore, the following description is made only on the portions different from those of Embodiment 1, but the description on similar portions is omitted or simplified.

Figure 18:
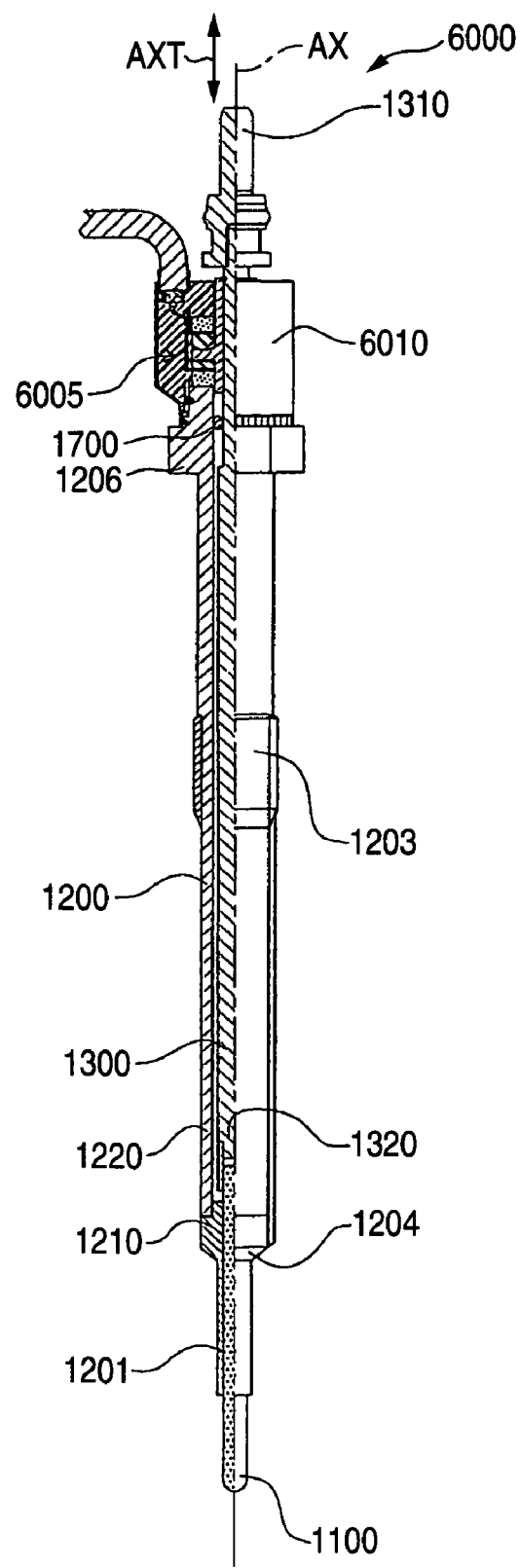
FIG. 18 is a half section of a glow plug having the combustion pressure detecting function according to Embodiment 2.

The glow plug 6000 according to Embodiment 2 is made, as shown in FIG. 18, to have a shape and a configuration substantially similar to those of the glow plug 1000 of Embodiment 2. However, the configuration of a combustion pressure sensor 6005 is slightly different, as described in the following.

In Embodiment 1, more specifically, the 1-1 electrode portion 1631 of the first electrode member 1630 and the first insulating spacer 1710 were interposed between the 1-1 face 1410 of the first piezoelectric element 1400 and the leading-end inward protruding face 1234 of the inward protrusion 1230 of the sensor cap 1230 (as referred to FIG. 2).

Moreover, the 2-1 electrode portion 1643 of the second electrode 1640 and the fourth insulating spacer 1740 were interposed between the 2-1 face 1510 of the second piezoelectric element 1500 and the root-end confronting face 1222 of the confronting portion 1221 (or the housing body root-end portion 1223).

Figure 19:
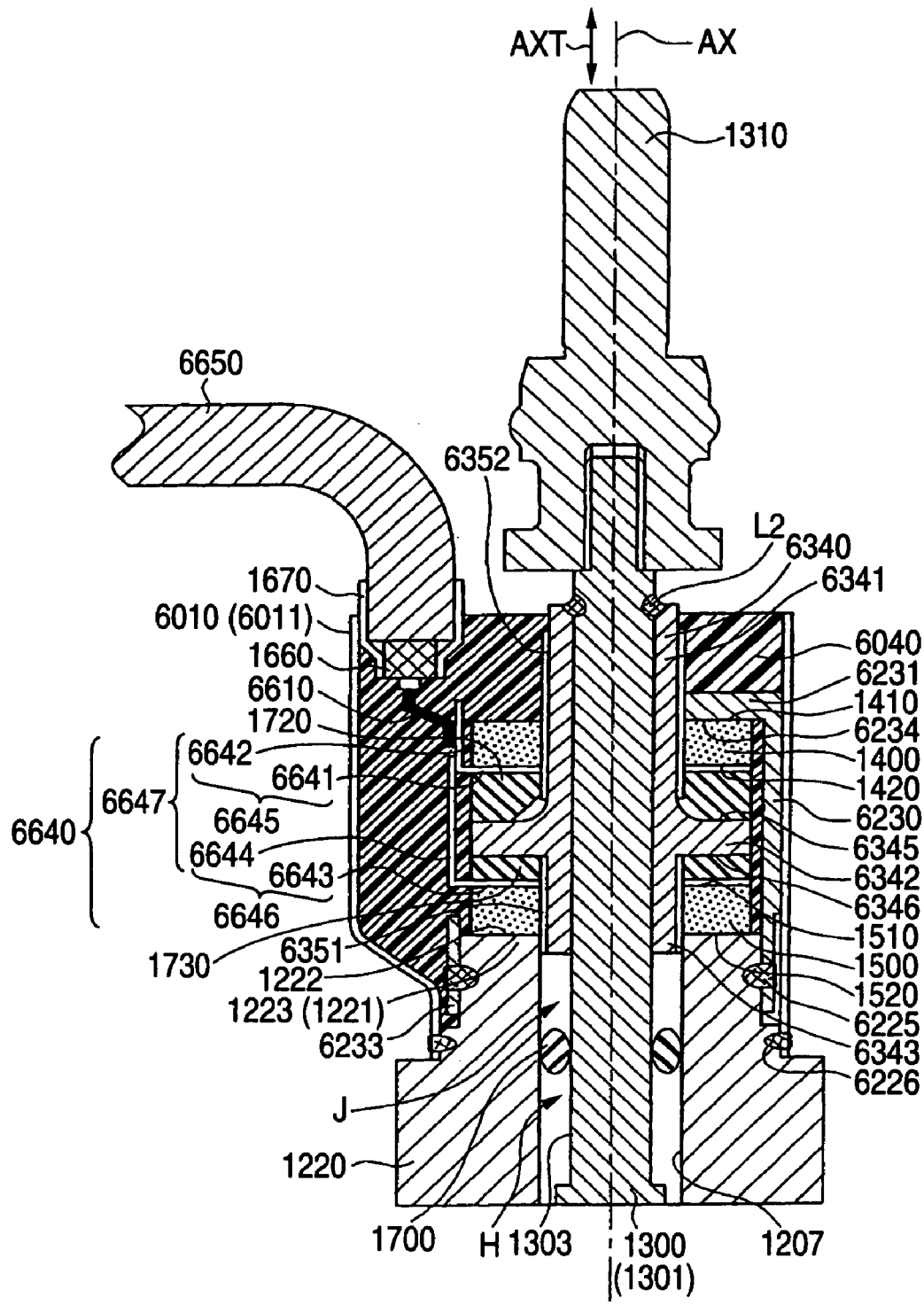
FIG. 19 is a partially enlarged longitudinal section showing the vicinity of the root end of the glow plug having the combustion pressure detecting function according to Embodiment 2, in an enlarged scale.

In Embodiment 2, on the contrary, the 1-1 face 1410 of the first piezoelectric element 1400 and a leading-end inward protruding face 6234 of an inward protrusion 6231 of a sensor cap 6230 are arranged to make direct contact with each other, as shown in FIG. 19. As a result, the charge produced on the 1-1 face 1410 of the first piezoelectric element 1400 is conducted to the housing 1200.

Moreover, the second piezoelectric element 1500 is so vertically inverted from Embodiment 1 that the 2-1 face 1510 is arranged toward the root-end side (as located on the upper side of FIG. 18), and that the 2-2 face 1520 is directed toward the leading-end side (as located on the lower side of the drawing). In addition, the arrangement is made such that the 2-2 face 1520 of the second piezoelectric element 1500 and the root-end confronting face 1222 of the confronting portion 1221 make direct contact with each other. As a result, the charge produced on the 2-2 face 1520 of the second piezoelectric element 1500 is also conducted to the housing 1200.

In the aforementioned Embodiment 1, moreover, the 1-2 face 1420 and the 2-1 face 1510 of the two piezoelectric elements were made conductive to each other by using the single second electrode member 1640 having the mode (as referred to FIG. 7), in which the ring-shaped 1-1 electrode portion 1641 and the 2-1 electrode portion 1643 were connected by the second connecting portion 1642. Here, the first electrode member 1630 was likewise.

Figure 20:
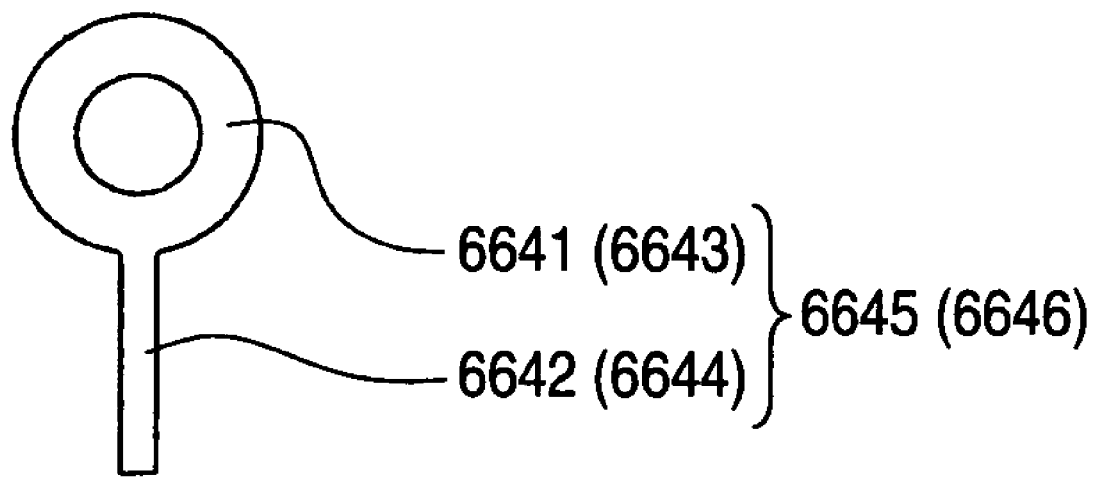
FIG. 20 is an explanatory view showing an electrode member to be used in the glow plug having the combustion pressure detecting function according to Embodiment 2.

In Embodiment 2, on the contrary, two members of similar shapes, i.e., a 1-2 electrode member 6645 and a 2-1 electrode member 6646 are used for making the 1-2 face 1420 and the 2-1 face 1510 of the two piezoelectric elements, as shown in FIG. 20. The 1-2 electrode member 6645 is equipped with a ring-shaped 1-2 electrode portion 6641 and a first extension 6642 extending radially outward from the former. Likewise, the 2-1 electrode member 6646 is equipped with a ring-shaped 2-1 electrode portion 6643 and a second extension 6644 extending radially outward from the former.

Moreover, the first extension 6642 of the 1-2 electrode member 6645 and the second extension 6644 of the 2-1 electrode member 6646 are made conductive to each other thereby to configure a second electrode member 6640, and the 1-2 face 1420 and the 2-1 face 1510 of the two piezoelectric elements are made conductive to each other.

Specifically, the second insulating spacer 1720, the 1-2 electrode portion 6641 of the 1-2 electrode member 6645, and the first piezoelectric element 1400 are so inserted in the recited order from the leading-end side into a first cylindrical portion 6341 which is positioned on the root-end side of the outer protrusion 6342 of a center pole sleeve 6340 and covered with an insulating tube 6352, that the 1-2 face may abut against the 1-2 electrode portion 6641. As has been described hereinbefore, moreover, the inward protrusion 6231 of the sensor cap 6230 is arranged such that its root-end inward protruding face 6234 makes direct contact at the root-end inward protruding face 6234 with the 1-1 face 1410 of the first piezoelectric element 1400.

Moreover, the third insulating spacer 1730, the 2-1 electrode portion 6643 of the 2-1 electrode member 6646, and the second piezoelectric element 1500 are so inserted from the root-end side into a second cylindrical portion 6343 which is positioned on the leading-end side of the outward protrusion 6342 and covered with an insulating tube 6351, that the 2-1 face 1510 may abut against the 2-1 electrode portion 6643. As has been described hereinbefore, moreover, the confronting portion 1221 of the housing body member 1220 makes direct contact at the leading-end confronting face 1222 with the 2-2 face 1520 of the second piezoelectric element 1500.

In a bulging portion 6011 of an enclosing member 6010, the second extension 6644, which extends from the 2-2 electrode portion 6643, of the 2-1 electrode member 6646 is folded midway toward the root-end side. Likewise, the first extension 6642, which extends from the 1-2 electrode portion 6641, of the 1-2 electrode member 6645 is folded midway toward the root-end side. Moreover, the first extension 6642 and the second extension 6644 are integrated at their overlapping portions by a spot-welding. On this root-end side, moreover, a lead wire 6610 of a cable 6650 is fixed to the first extension 6642 by a spot-welding. As a result, the 1-2 electrode member 6645 and the 2-1 electrode member 6646 are conducted to each other to configure the second electrode member 6640, so that the charges produced on the 1-2 face 1420 and the 2-1 face 1510 of the two piezoelectric elements can be derived together to the outside.

As in Embodiment 1, moreover, the first piezoelectric element 1400 and the second piezoelectric element 1500 are individually pre-loaded. As in Embodiment 1, more specifically, the housing body member 1220 and an annular portion 6233 of the sensor cap 6230 are fixed in a pre-loaded state at a root-end side first welded portion 6225 by a laser-welding. Moreover, the center pole sleeve 6340 is arc-welded to and integrated with the center pole body 1301 at the portion L2 on the root end of the first cylindrical portion 6341. Moreover, a root-end side second welded portion 6226 is formed by covering the housing body member 1220 from the root-end side with the enclosing member 6010 and by laser-welding the enclosing member 6010 and the housing body member 1220 all over the circumference. As in Embodiment 1, moreover, the enclosing member 6010 is filled with a resin 6040 to protect the combustion pressure sensor 6005 against moisture and oil.

When the combustion pressure is produced by the run of the internal combustion engine so that the center pole 1300 of the glow plug 6000 of Embodiment 2 is displaced in its axial direction, the glow plug 6000 can also obtain the output of the combustion pressure sensor 6005 (i.e., the first and second piezoelectric elements 1400 and 1500). As in Embodiment 1, moreover, the charges of the two piezoelectric elements 1400 and 1500 are outputted together so that a high output can be obtained. When the center pole 130 is relatively displaced to the root-end side, moreover, the compressive load increases in the first piezoelectric element 1400 but decreases in the second piezoelectric element 1500. As in Embodiment 1, therefore, it is possible to suppress the change in the sensitivity due to the magnitude of the fastening torque at the time when the glow plug 6000 is mounted in the internal combustion engine. Moreover, the production of the charge by the electrically focusing effect of the case in which the temperature of the glow plug 6000 (or the combustion pressure sensor 6005) changes is suppressed as in Embodiment 1.

In the glow plug 6000 of Embodiment 2, moreover, unlike the glow plug 1000 of Embodiment 1, the 1-1 face of the first piezoelectric element 1400 and the 2-2 face of the second piezoelectric element 1500 are conducted to the housing 1200. Therefore, the single lead wire 6610 is sufficient form the output of the combustion pressure sensor 6005. Moreover, the configuration of the combustion pressure sensor 6005 is made simpler than that of the combustion pressure sensor 1005 (as referred to FIG. 2) of Embodiment 1, thereby to reduce the number of parts and facilitate the assembly. If, there fore, there is adopted a detecting method considering the fluctuation of the earth level of the housing 1200 properly, the glow plug 6000 used can be made simpler in configuration and less expensive than the glow plug 1000 of Embodiment 1.

In Embodiment 1, moreover, it is necessary to insert the 1-2 electrode portion 1641 of the second electrode member 1640 into the first cylindrical portion 1341 of the center pole sleeve 1340 and to insert the 2-1 electrode portion 1643 into the second cylindrical portion 1343. Therefore, the second connecting portion 1642 of the second electrode member 1640 cannot be retained within a length sufficient for connecting the 1-2 face 1420 and the 2-1 face 1510 of the two piezoelectric elements 1400 and 1500 after assembled, but has to have a length sufficient for assembling the second electrode member 1640. Similar discussion applies to the first connecting portion 1632 of the first electrode member 1630.

If, however, the second connecting portion 1642 is thus elongated, it may become longitudinally excessive after the assembly, and this longitudinally excessive portion may make a short-circuit with either the first connecting portion 1632 or the outward protrusion 1720 also having an excessive length, or the enclosing member 1010. At the assembly of the glow plug 1000, moreover, the order of assembling the first and second electrode members 1230 and 1240 has to be considered, and the assembly itself is difficult.

In the glow plug 6000 of Embodiment 2, on the contrary, the second electrode member 1640 used in the glow plug 1000 of Embodiment 1 is replaced by the two members of the 1-2 electrode member 6645 and the 2-1 electrode member 6646 thereby to configure a second electrode member 6647. Therefore, the 1-2 electrode portion 6641 and the 2-1 electrode portion 6643 can be easily inserted into the first cylindrical portion 6341 and the second cylindrical portion 6343 of the center pole sleeve 6340. In addition, the first and second piezoelectric element 1400 or the like and the sensor cap 6230 may be overlaid and welded, and the first and second extensions 6642 and 6644 may also be folded at predetermined positions and welded to each other. Moreover, the lead wire 6610 may be welded. Therefore, the first and second extensions 6642 and 6644 to configure the second connecting portion 6647 after assembled can be suitably adjusted to a suitable length thereby to reduce the possibility of short-circuit with an outward protrusion 6342, the enclosing member 6010 and so on.

Although the invention has been described on Embodiments 1 and 2 and Modifications 1 and 2, the invention should not be limited to those examples or the like but can naturally be properly modified without departing from the gist thereof.

In Embodiment 1, for example, the first piezoelectric element 1400 and the second piezoelectric element 1500 were arranged on the two sides (i.e., on the leading-end side and the root-end side, as located on the upper and lower sides of the drawing) of the outer protrusion 1342 of the center pole sleeve 1340 and were clamped from their leading-end side and the root-end side between the confronting portion 1221 of the housing body member 1220 and the inward protrusion 1231 of the sensor cap 11230 through the first insulating spacer 1710 or the like.

According to the relative displacement between the center pole and the housing, however, the compressive force to be applied to the preload of the compression may be applied to either the first piezoelectric element or the second piezoelectric element so that a force to reduce the preload of the compression may be applied to either of them. Therefore, another configuration could be made, for example, such that the first and second piezoelectric elements are disposed on the two sides (i.e., on the leading-end side and the root-end side) of the inward protrusion formed in the housing and clamped from the leading-end side to the root-end side between the two outward protrusions formed at the center pole.

Moreover, Embodiment 2 was exemplified by deriving the charges of the 1-2 face 1420 and the 2-1 face 1510 of the two piezoelectric elements 1400 and 1500 from the 1-2 electrode member 6645 and the 2-1 electrode member 6646. However, electrode members of the same shape as that of the 1-2 electrode member 6645 and the 2-1 electrode member 6646 used in Embodiment 2 can also be used in place of the first electrode member 1630 and the second electrode member 1640 in Embodiment 1. In this case, too, it is possible to facilitate the assembly of the first and second electrode members and to properly prevent the drawback such as the short-circuit due to the excessive length of the first and second connecting portions after the assembly.

In Embodiment 2, moreover, the 1-1 face 1410 and the 2-2 face of the two piezoelectric elements 1400 and 1500 were conducted to the housing. However, the configuration can also be modified such that the first and second piezoelectric elements 1400 and 1500 are vertically inverted, and such that the 1-2 face 1420 and the 2-1 face 1510 are conducted to the housing. In another modification, the inward protrusion of the housing is equipped on its leading-end side and root-end side with the first piezoelectric elements, and these piezoelectric elements are clamped between the two outward protrusions of the center pole. Moreover, either the 1-1 face and the 2-2 face or the 1-2 face and the 2-1 face may be conducted to the housing.

On the other hand, Embodiment 2 was configured to connect the first face 1410 of the first piezoelectric element 1400 and the leading-end inward protruding face 6234 of the inward protrusion 6231 directly. However, a conductive (or metallic) ring can also be interposed between them. This modification is more preferable because the compressive stress can be homogeneously applied to the first piezoelectric element 1400.

In Embodiment 2, moreover, the outward protrusion 6342 of the center pole sleeve 6340 and the second connecting portion 6647 (or the second extension 6644) are slightly spaced from each other, as shown in FIG. 19. In order to ensure the insulation between them, however, another modification can be made such that the second extension 6644 is covered on the necessary portion with an insulating tube (or an insulating thermally shrinkable tube), or such that the outer protrusion 6342 is covered on its outer circumference with an insulating tube.

Still moreover, Embodiments 1, 2 and so on were made by using the two piezoelectric elements. However, another modification can be made such that numerous or four piezoelectric elements are used in a pair.

This application is based on Japanese Patent application JP 2004-229525, filed Aug. 5, 2004, Japanese Patent application JP 2005-89525, filed Mar. 25, 2005, and Japanese Patent application JP 2005-187099, filed Jun. 27, 2005, the entire contents of which are hereby incorporated by reference, the same as if set forth at length.

What is claimed is:

1. A glow plug comprising:
   a cylindrical housing;
   a heater member held in said housing for generating heat upon energization;
   a conductive center pole inserted into said housing and conducted to said heater member for being displaced relative to said housing in an axial direction along an axis of said housing in accordance with a change in a combustion pressure of an internal combustion engine;
   a first piezoelectric element for generating a charge in response to a change in a stress applied to said first piezoelectric element, said first piezoelectric element having a first plus face for generating a plus charge and a first minus face for generating a minus charge when said first piezoelectric element is compressed in an axial direction; and
   a second piezoelectric element for generating a charge in response to a change in a stress applied to said second piezoelectric element, said second piezoelectric element having a second plus face for generating a plus charge and a second minus face for generating a minus charge when said second piezoelectric element is compressed in an axial direction;
   wherein each of said first piezoelectric element and said second piezoelectric element is subjected to a preload for compressing it in said axial direction and is arranged such that, when said center pole is displaced to a root-end side, a load to be applied to one of said first piezoelectric element and said second piezoelectric element for compressing the same in said axial direction increases whereas a load to be applied to the other for compressing the same in said axial direction decreases;

wherein said first piezoelectric element is polarized in said axial direction, said first plus face and said first minus face are a 1-1 face and a 1-2 face normal to said axis, respectively, said second piezoelectric element is polarized in said axial direction, and said second plus face and said second minus face are a 2-1 face and a 2-2 face normal to said axis, respectively.

2. The glow plug according to claim 1, comprising:

said heater member;

said housing including:

a housing leading-end portion provided on the most leading-end side of an axial direction;

a housing root-end portion provided on the most root-end side of said axial direction;

an externally threaded portion provided between said housing leading-end portion and said housing root-end portion for screwing said housing into a mounting hole of an internal combustion engine;

a sealing portion provided between said housing leading-end portion and said externally threaded portion and pressed into direct or indirect contact with a portion in said mounting hole for holding gas-tightness between said housing and said mounting hole; and a heater holding portion provided on a leading-end side of said externally threaded portion in said axial direction, said housing being mounted in said internal combustion engine by said screwing such that said housing leading-end portion is provided on a combustion chamber side of said internal combustion engine;

said center pole including:

a center pole root-end portion provided on said axial root-end side; and a center pole leading-end portion provided on said axial leading-end side, said center pole being housed in said housing, being provided such that said center pole root-end portion protrudes from said housing root-end portion, being electrically conducted at said center pole leading-end portion with said beater member, and being jointed directly or indirectly and mechanically rigidly to said heater member;

a first piezoelectric element polarized in said axial direction for producing charges in response to a change in a stress to be applied to said first piezoelectric element and including;

a 1-1 face and a 1-2 face normal to said axis for producing a plus charge on said 1-1 face and a minus charge on said 1-2 face when said first piezoelectric element is compressed in said axial direction; and a second piezoelectric element polarized in said axial direction for producing charges in response to a change in a stress to be applied to said second piezoelectric element and including:

a 2-1 face and a 2-2 face normal to said axis for producing a plus charge on said 2-1 face and a minus charge on said 2-2 face when said second piezoelectric element is compressed in said axial direction, wherein said first piezoelectric element and said second piezoelectric element are clamped in said axial direction while engaging directly or indirectly with a housing root-end portion of said housing and said center pole.

3. The glow plug according to claim 1, comprising:

said heater member;

said housing including:

a housing leading-end portion provided on the most leading-end side of an axial direction;

a housing root-end portion provided on the most root-end side of said axial direction and including an inward protrusion protruding radially inward and having a leading-end inward protruding face directed to said axial leading-end side, and a confronting portion provided on said axial leading-end side of said inward protrusion and having a root-end confronting face confronting said leading-end inward protruding face;

an externally threaded portion provided between said housing leading-end portion and said housing root-end portion for screwing said housing into a mounting hole of an internal combustion engine;

a sealing portion provided between said housing leading-end portion and said externally threaded portion and pressed into direct or indirect contact with a predetermined portion in said mounting hole for holding a gas-tightness between said housing and said mounting hole; and a heater holding portion provided on a leading-end side of said externally threaded portion in said axial direction, said housing being mounted in said internal combustion engine by said screwing such that said housing leading-end portion is provided on a combustion chamber side of said internal combustion engine;

said center pole including:

a center pole root-end portion provided on said axial root-end side;

a center pole leading-end portion provided on said axial leading-end side; and an outward protrusion provided between said center pole root-end portion and said center pole leading-end portion and protruding radially outward, said outward protrusion having a root-end outward protruding face directed to an axial root-end side and a leading-end outward protruding face directed to an axial leading-end side, said center pole being housed in said housing, being arranged such that said center pole root-end portion protrudes from said housing root-end portion, being electrically conducted at said center pole leading-end portion with said heater member, and being jointed directly or indirectly and mechanically rigidly to said heater member;

a first piezoelectric element clamped between said leading-end inward protruding face of said inward protrusion of said housing and said root-end outward protruding face of said outward protrusion and polarized in said axial direction for producing charges in response to a change in a stress to be applied to said first piezoelectric element and including:

a 1-1 face and a 1-2 face normal to said axis for producing a plus charge on said 1-1 face and a minus charge on said 1-2 face when said first piezoelectric element is compressed in said axial direction; and a second piezoelectric element clamped between said root-end confronting face of said confronting portion of said housing and said leading-end outward protruding face of said outward protrusion and polarized in said axial direction for producing charges in response to a change in a stress to be applied to said second piezoelectric element and including:
a 2-1 face and a 2-2 face normal to said axis for producing a plus charge on said 2-1 face and a minus charge on said 2-2 face when said second piezoelectric element is compressed in said axial direction.

4. The glow plug according to claim 1, wherein said first piezoelectric element and said second piezoelectric element are piezoelectric elements having characteristics identical to each other.

5. The glow plug according to claim 1, further comprising at least one of:
a first conductive path member for conducting a 1-1 face of said first piezoelectric element and a 2-2 face of said second piezoelectric element to each other; and
a second conductive path member for conducting a 1-2 face of said first piezoelectric element and a 2-1 face of said second piezoelectric element,
wherein each of said first conductive path member and said second conductive path member includes a bridge portion spanning between the two faces to be conducted, on radially outer sides of said two faces for conducting said two faces.

6. The glow plug according to claim 5,
wherein each of said first conductive path member and said second conductive path member includes:
a first member including a first face abutting portion abutting against one of two faces conducted by it, and
a first bridge forming portion extracted radially outward from said first face abutting portion for forming at least part of said bridge portion, and
a second member including a second face abutting portion abutting against the other of the two faces conducted by it, and a second bridge forming portion extracted radially outward from said second face abutting portion for forming said bridge portion together with said first bridge forming portion.

7. The glow plug according to claim 1,
wherein said housing further includes:
a housing leading-end portion provided on the most leading-end side of said axial direction;
a housing root-end portion provided on the most root-end side of said axial direction;
an externally threaded portion provided between said housing leading-end portion and said housing root-end portion for screwing said housing in a mounting hole of an internal combustion engine; and
a tool engaging portion provided between said housing root-end portion and said externally threaded portion for engaging with a tool at said screwing, and
wherein said first piezoelectric element and said second piezoelectric element are provided in said housing root-end portion.

8. The glow plug according to claim 1, wherein said housing is sealed on its root-end side with a resin.

9. The glow plug according to claim 1, further comprising a ring-shaped sealing member having said center pole inserted therethrough,
wherein said sealing member is provided on a leading-end side, as viewed in said axial direction, of said first piezoelectric element and said second piezoelectric element, for making space, as located closer to sides of said first piezoelectric element and said second piezoelectric element than said sealing member, between an outer side face of said center pole and an inner side face of said housing, gastight with respect to the space on a leading-end side of said sealing member.

10. The glow plug according to claim 1, wherein the first plus face of the first piezoelectric element and the second plus face of the second piezoelectric element face the same axial direction.

11. A glow plug comprising:
a cylindrical housing;
a heater member held in said housing for generating heat upon energization; a conductive center pole inserted into said housing and conducted to said heater member for being displaced relative to said housing in an axial direction along an axis of said housing in accordance with a change in a combustion pressure of an internal combustion engine;
a first piezoelectric element having a first inner circumference electrode formed on an inner circumference thereof and a first outer circumference electrode formed on an outer circumference thereof, said first piezoelectric element having a polarizing direction that is polarized radially outward perpendicular to the axis, said first piezoelectric element generating a plus charge in the first inner circumference electrode and a negative charge in the first outer circumference electrode when a compressive load is applied to the first piezoelectric element in the axial direction;
a second piezoelectric element having a second inner circumference electrode formed on an inner circumference thereof and a second outer circumference electrode formed on an outer circumference thereof, said second piezoelectric element having a polarizing direction that is polarized radially inward perpendicular to the axis, said second piezoelectric element generating a plus charge in the second inner circumference electrode and a negative charge in the second outer circumference electrode when a compressive load is applied to the second piezoelectric element in the axial direction;
wherein each of said first piezoelectric element and said second piezoelectric element is subjected to a preload for compressing it in said axial direction and is arranged such that, when said center pole is displaced to a root-end side, a load to be applied to one of said first piezoelectric element and said second piezoelectric element for compressing the same in said axial direction increases whereas a load to be applied to the other for compressing the same in said axial direction decreases.

12. A glow plug comprising:
a cylindrical housing;
a heater member held in said housing for generating heat upon energization;
a conductive center pole inserted into said housing and conducted to said heater member for being displaced relative to said housing in an axial direction along an axis of said housing in accordance with a change in a combustion pressure of an internal combustion engine;
a first piezoelectric element for generating a charge in response to a change in a stress applied to said first piezoelectric element, said first piezoelectric element having a first plus face for generating a plus charge and a first minus face for generating a minus charge when said first piezoelectric element is compressed in an axial direction; and
a second piezoelectric element for generating a charge in response to a change in a stress applied to said second piezoelectric element, said second piezoelectric element having a second plus face for generating a plus charge and a second minus face for generating a minus charge when said second piezoelectric element is compressed in an axial direction;

wherein each of said first piezoelectric element and said second piezoelectric element is subjected to a preload for compressing it in said axial direction and is arranged such that, when said center pole is displaced to a root-end side, a load to be applied to one of said first piezoelectric element and said second piezoelectric element for compressing the same in said axial direction increases whereas a load to be applied to the other for compressing the same in said axial direction decreases;

wherein said first piezoelectric element and said second piezoelectric element are insulated from said center pole and said housing.

13. A glow plug comprising:

a cylindrical housing;

a heater member held in said housing for generating heat upon energization;

a conductive center pole inserted into said housing and conducted to said heater member for being displaced relative to said housing in an axial direction along an axis of said housing in accordance with a change in a combustion pressure of an internal combustion engine;

a first piezoelectric element for generating a charge in response to a change in a stress applied to said first piezoelectric element, said first piezoelectric element having a first plus face for generating a plus charge and a first minus face for generating a minus charge when said first piezoelectric element is compressed in an axial direction; and a second piezoelectric element for generating a charge in response to a change in a stress applied to said second piezoelectric element, said second piezoelectric element having a second plus face for generating a plus charge and a second minus face for generating a minus charge when said second piezoelectric element is compressed in an axial direction;

wherein each of said first piezoelectric element and said second piezoelectric element is subjected to a preload for compressing it in said axial direction and is arranged such that, when said center pole is displaced to a root-end side, a load to be applied to one of said first piezoelectric element and said second piezoelectric element for compressing the same in said axial direction increases whereas a load to be applied to the other for compressing the same in said axial direction decreases;

wherein charges to be produced on the two faces of one pair of said 1-1 face of said first piezoelectric element and said 2-2 face of said piezoelectric element, and said 1-2 face of said piezoelectric element and said 2-1 face of said second piezoelectric element are derived to outside while being insulated from said center pole and said housing, and wherein charges to be produced on the two faces of the other pair are derived to outside through said housing.

* * * * *